US010473461B2

(12) United States Patent
Fuchikami

(10) Patent No.: US 10,473,461 B2
(45) Date of Patent: Nov. 12, 2019

(54) MOTION-SENSOR DEVICE HAVING MULTIPLE LIGHT SOURCES

(71) Applicant: Panasonic Intellectual Property Management Co., Ltd., Osaka (JP)

(72) Inventor: Ryuji Fuchikami, Fukuoka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 357 days.

(21) Appl. No.: 14/432,024

(22) PCT Filed: Mar. 19, 2014

(86) PCT No.: PCT/JP2014/001580
§ 371 (c)(1),
(2) Date: Mar. 27, 2015

(87) PCT Pub. No.: WO2014/162675
PCT Pub. Date: Oct. 9, 2014

(65) Prior Publication Data
US 2015/0292884 A1 Oct. 15, 2015

(30) Foreign Application Priority Data
Apr. 1, 2013 (JP) .................. 2013-075622

(51) Int. Cl.
*G01C 3/08* (2006.01)
*G01P 13/00* (2006.01)
(Continued)

(52) U.S. Cl.
CPC .............. *G01C 3/08* (2013.01); *G01P 13/00* (2013.01); *H04N 5/2256* (2013.01);
(Continued)

(58) Field of Classification Search
CPC ......... G01C 3/08; G01P 13/00; H04N 5/2256; H04N 5/232
(Continued)

(56) References Cited

U.S. PATENT DOCUMENTS 5,764,874 A * 6/1998 White ............... G01N 21/8806
396/155
6,441,888 B1 * 8/2002 Azuma ................... G01S 7/481
356/4.01
(Continued)

FOREIGN PATENT DOCUMENTS

EP       2306228 A1    4/2011
JP     H09-203631 A    8/1997
(Continued)

OTHER PUBLICATIONS

Liadsky, J., "Introduction to Lidar", NPS Lidar Workshop, Optech Inc., May 24, 2007.*
(Continued)

*Primary Examiner* — Richard A Hansell, Jr.
(74) *Attorney, Agent, or Firm* — Renner, Otto, Boisselle & Sklar, LLP

(57) ABSTRACT

A motion sensor device according to an embodiment of the present disclosure includes an image sensor (101) and LED light sources (102, 103). Using an image captured by the image sensor (101) when both of the LED light sources (102, 103) are turned ON and an image captured by the image sensor (101) when only the LED light source (103) is turned ON, the distance to an object is estimated based on the luminance ratio of the object.

11 Claims, 16 Drawing Sheets

(51) Int. Cl.
*H04N 5/225* (2006.01)
*H04N 5/232* (2006.01)

(52) U.S. Cl.
CPC ......... *H04N 5/232* (2013.01); *H04N 5/23216* (2013.01); *H04N 5/23293* (2013.01)

(58) Field of Classification Search
USPC ....................................................... 348/139
See application file for complete search history.

(56) References Cited

U.S. PATENT DOCUMENTS

| | | | | |
|---|---|---|---|---|
| 7,720,554 | B2* | 5/2010 | DiBernardo | G01S 5/163 356/139.03 |
| 9,292,732 | B2* | 3/2016 | Ono | G06K 9/00201 |
| 2001/0038750 | A1* | 11/2001 | Kindaichi | G02B 7/32 396/96 |
| 2002/0191834 | A1* | 12/2002 | Fishbaine | G01B 11/2518 382/150 |
| 2003/0155513 | A1* | 8/2003 | Remillard | G01S 7/484 250/341.8 |
| 2003/0193657 | A1* | 10/2003 | Uomori | G01B 11/25 356/3.1 |
| 2008/0186475 | A1* | 8/2008 | Kawata | G01B 11/026 356/73 |
| 2008/0231835 | A1* | 9/2008 | Iizuka | G01S 17/08 356/72 |
| 2008/0237445 | A1* | 10/2008 | Ikeno | G01S 17/32 250/205 |
| 2010/0067002 | A1* | 3/2010 | Ishii | A61B 1/00009 356/317 |
| 2010/0141946 | A1* | 6/2010 | Johannesson | G01B 11/2518 356/338 |
| 2010/0202688 | A1* | 8/2010 | Yu | G06T 7/11 382/173 |
| 2010/0303299 | A1* | 12/2010 | Cho | G01B 11/026 382/106 |
| 2012/0153121 | A1 | 6/2012 | Onishi | |
| 2012/0232836 | A1* | 9/2012 | Ohmi | G06F 3/0304 702/150 |
| 2013/0026350 | A1 | 1/2013 | Yao et al. | |
| 2013/0076927 | A1* | 3/2013 | Lee | H04N 5/2351 348/216.1 |
| 2013/0076932 | A1* | 3/2013 | Chhibber | A61B 5/0077 348/222.1 |

FOREIGN PATENT DOCUMENTS

| | | |
|---|---|---|
| JP | 2001-012909 A | 1/2001 |
| JP | 3415070 B | 4/2003 |
| JP | 2008-128815 A | 6/2008 |
| JP | 2012-127835 A | 7/2012 |
| JP | 2013-029508 A | 2/2013 |
| WO | WO 2012/063387 A1 | 5/2012 |

OTHER PUBLICATIONS

Liadsky, J., "Introduction to Lidar", NPS Lidar Workshop, Optech Inc., May 24, 2007 (Year: 2007).*
International Search Report for corresponding International Application No. PCT/JP2014/001580 dated May 13, 2014.
Form PCT/ISA/237 for corresponding International Application No. PCT/JP2014/001580 dated May 13, 2014 and partial English translation.
International Preliminary Report on Patentability for corresponding International Application No. PCT/JP2014/001580 dated Oct. 7, 2014.
Chinese Search Report dated Mar. 19, 2014 for Chinese Application No. 201480002584.4.

* cited by examiner

MOTION-SENSOR DEVICE HAVING MULTIPLE LIGHT SOURCES

TECHNICAL FIELD

The present application relates to a motion sensor device with multiple light sources.

BACKGROUND ART

Patent Document No. 1 discloses a technique for measuring the distance to an object (or target) which is either standing still or moving based on a plurality of images that have been captured by a single image sensor by projecting light time-sequentially from multiple light sources onto the object.

CITATION LIST

Patent Literature

Patent Document No. 1: Japanese Laid-Open Patent Publication No. 2001-12909

SUMMARY OF INVENTION

Technical Problem

According to the conventional technologies, the accuracy or sensitivity of the distance measured may decline depending on the position of the object. Thus, an embodiment of the present disclosure provides a novel motion sensor device which can overcome such a problem with the conventional technologies.

Solution to Problem

A motion sensor device according to an aspect of the present disclosure includes: an image sensor; a plurality of light sources including first, second and third light sources, the first light source being arranged at a first distance from the image sensor in a first direction, the second light source being arranged at a second distance from the image sensor in a second direction, the third light source being arranged at a third distance from the image sensor in a third direction; and a controller configured to control the image sensor and the plurality of light sources. The controller is configured to: make the image sensor capture a first frame with light emitted from the first light source at a first time; make the image sensor capture a second frame with light emitted from the second light source at a second time; make the image sensor capture a third frame with light emitted from the third light source at a third time; obtain information about a distance to an object based on a plurality of images which have been gotten by capturing the first, second and third frames; obtain multiple pieces of information about an estimated distance to the object based on information representing a direction of the object derived from at least one of the plurality of images and a luminance of the object derived from each of the plurality of images; and determine the information about the distance based on the multiple pieces of estimated distance information.

A motion sensor device according to another aspect of the present disclosure includes: an image sensor; a plurality of light sources including first and second light sources, the first light source being arranged at a first distance from the image sensor in a first direction, the second light source being arranged at a second distance from the image sensor in a second direction; and a controller configured to control the image sensor and the plurality of light sources. The controller is configured to: make the image sensor capture a first frame with light emitted from the first light source at a first time; make the image sensor capture a second frame with light emitted from both of the first and second light sources at a second time; and obtain information about an estimated distance to an object based on a plurality of images which have been gotten by capturing the first and second frames.

A motion sensor device according to still another aspect of the present disclosure includes: an image sensor; a plurality of light sources including first and second light sources, the first light source being arranged at a first distance from the image sensor in a first direction, the second light source being arranged at a second distance from the image sensor in a second direction; and a controller configured to control the image sensor and the plurality of light sources. The controller is configured to: make the image sensor capture a first frame with light emitted from the first light source at a first time; make the image sensor capture a second frame with light emitted from the second light source at a second time; and obtain information representing a direction of the object based on a plurality of images which have been gotten by capturing the first and second frames, obtain a first piece of information about an estimated distance to the object based on a luminance of the object derived from each of the plurality of images, obtain a second piece of information about an estimated distance to the object by another method of measuring the distance, and obtain information about the distance to the object based on the first and second pieces of information about the estimated distance.

An electronic device according to the present disclosure includes: a motion sensor device according to any of the embodiments described above; and a display which changes what to present thereon in response to a motion of the object detected by the motion sensor device.

An integrated circuit according to the present disclosure is to be used in a motion sensor device according to any of the embodiments described above, and includes: a timing controller which is connected to the image sensor and the light sources to control timings of exposure and light emission; an extreme value searching section which processes image capturing data to search an area with a relatively high luminance; a coordinate memory which stores the coordinates and luminance of the area that has been searched by the extreme value searching section; and a distance calculating section which calculates estimated distance information based on a luminance ratio by choosing frames that have been shot in the same area under different conditions from data in the coordinate memory.

A distance estimating method according to the present disclosure is performed by a motion sensor device according to any of the embodiments described above, and includes the steps of: searching for an extreme value by extracting selectively a range with a relatively high light intensity from data of captured frames and by calculating its coordinates and light intensity; calculating the ratio of luminances that have been extracted in the extreme value searching step and that have been selected from among luminances of frames shot under different conditions; and converting the luminance ratio calculated in the luminance ratio calculating step and the coordinates searched for in the extreme value searching step into a distance.

A computer program according to the present disclosure is defined to make a motion sensor device according to any of the embodiments described above perform the steps of: searching for an extreme value by extracting selectively a range with a relatively high light intensity from data of captured frames and by calculating its coordinates and light intensity; calculating the ratio of luminances that have been extracted in the extreme value searching step and that have been selected from among luminances of frames shot under different conditions; and converting the luminance ratio calculated in the luminance ratio calculating step and the coordinates searched for in the extreme value searching step into a distance.

Advantageous Effects of Invention

A motion sensor device according to an embodiment of the present disclosure can prevent errors from being caused in the distance being measured.

DESCRIPTION OF EMBODIMENTS

The basic principle on which the distance to an object (or subject) can be measured by a motion sensor device according to the present disclosure will be described.

Figure 1A:
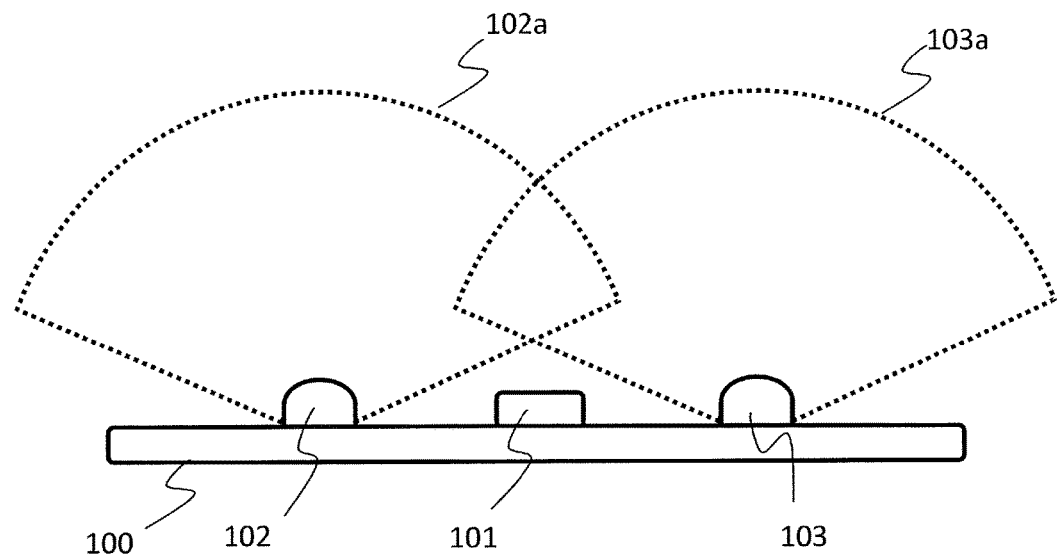
FIG. 1A A cross-sectional view schematically illustrating a cross section of a motion sensor device with two light sources.
Figure 1B:
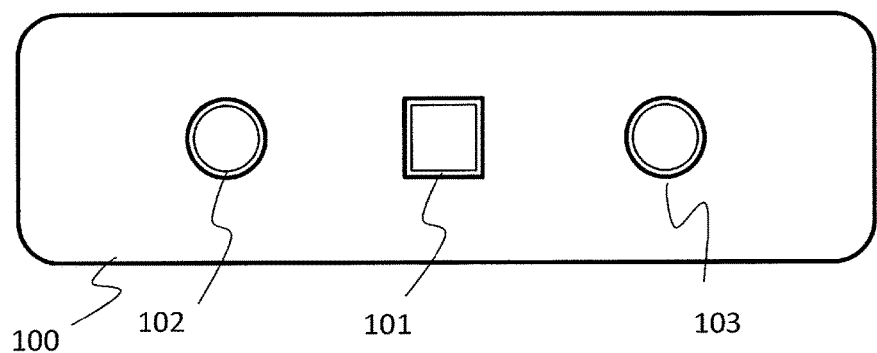
FIG. 1B A top view of the device shown in FIG. 1A.

First of all, look at FIGS. 1A and 1B. FIG. 1A is a cross-sectional view schematically illustrating a cross section of a motion sensor device, and FIG. 1B is a top view of the device shown in FIG. 1A.

The device shown in FIGS. 1A and 1B includes an image sensor 101 which is arranged at its center and two LED light sources 102 and 103 which are arranged on both sides of the image sensor 101. In the example illustrated in FIGS. 1A and 1B, the image sensor 101 and LED light sources 102, 103 are mounted on a single substrate 100. The image sensor is a solid-state image sensor in which a huge number of very small photosensitive cells (photodiodes) are arranged in columns and rows, and is typically a CCD (charge-coupled device) type or a CMOS type.

In FIG. 1A, illustrated schematically are light 102a emitted from the first light source 102 and light 103a emitted from the second light source 103. This device can measure the distance to a target of measurement (i.e., object) by capturing an image with the LED light sources 102, 103 turned ON alternately. It should be noted that "to measure the distance" will also refer herein to calculating an estimated distance from the image sensor to the object or obtaining an estimated value indicating the object's position in a space. Examples of the objects include a human being's hand(s) or finger(s) and a pen or something else held in his or her hand. The object may be in motion. A three-dimensional motion sensor device which can obtain in real time either the distance to a person's fingertip that is moving at high speeds or an estimated value indicating the fingertip's position may be used as an "input device" in various kinds of electronic devices including computers, tablet terminals, smartphones, game consoles and consumer electronic devices.

Figure 2:
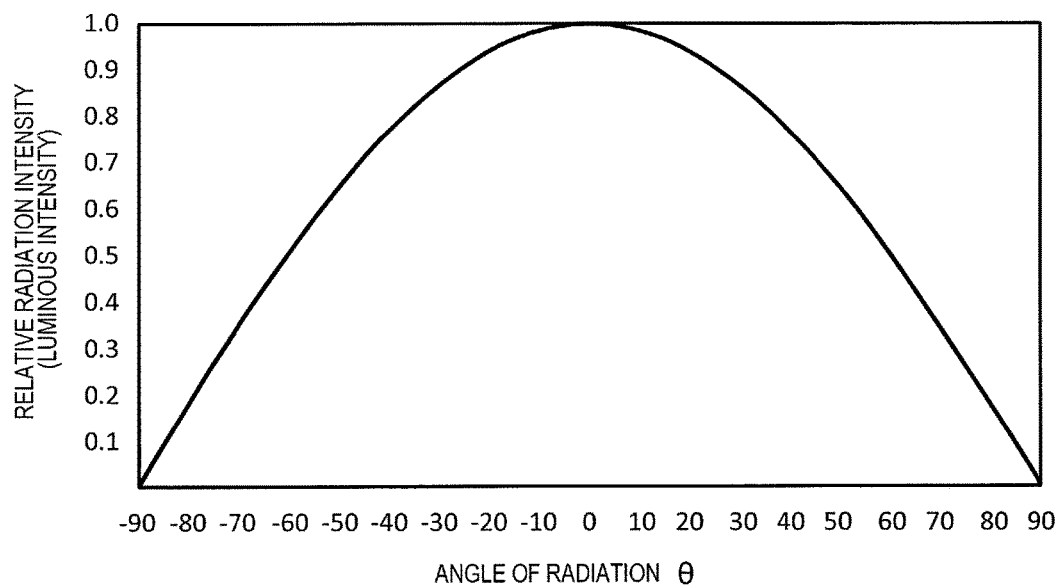
FIG. 2 A graph showing how the relative radiation intensity of an LED light source changes with the angle of radiation.
Figure 3:
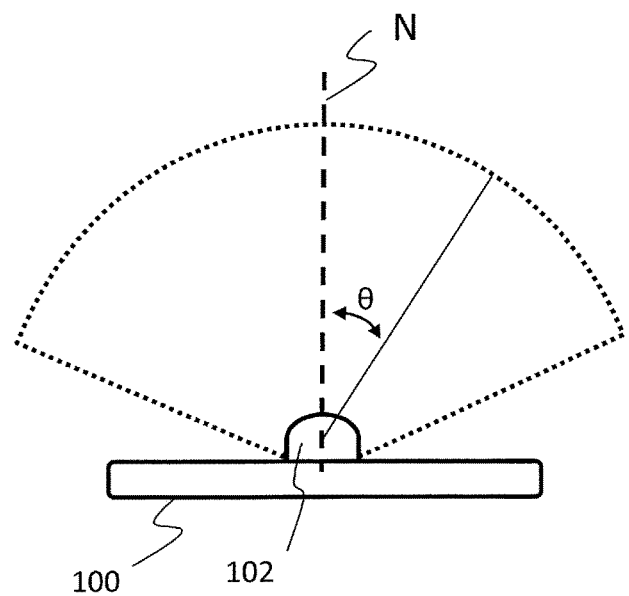
FIG. 3 Illustrates the angle of radiation of an LED light source.

FIG. 2 is a graph showing the radiation pattern (i.e., the light distribution characteristic) of the light emitted from each of the LED light sources 102 and 103. The abscissa of this graph represents the angle θ defined by the radiation direction with respect to a normal N to the substrate 100 as shown in FIG. 3. On the other hand, the ordinate of this graph represents the relative radiation intensity. In the following description, the angle θ defined by the radiation will be sometimes hereinafter referred to as the "angle of radiation". It should be noted that the relative radiation intensity value corresponds to the illuminance of an object which is arranged at a position in a direction that defines a particular angle with respect to the light source (i.e., radiation illuminance).

As can be seen from FIG. 2, the radiation emitted from each of the LED light sources 102 and 103 exhibits the highest intensity when the angle θ is zero degrees. In the example shown in FIG. 2, the LED light sources 102 and 103 have a light distribution characteristic, of which the radiation intensity can be approximated by $I_0 \times \cos \theta$. However, the LED light sources 102 and 103 do not have to have the light distribution characteristic shown in FIG. 2. In addition, the radiation emitted from the LED light sources 102 and 103 does not have to be visible light but may also be an electromagnetic wave such as an infrared ray which falls within a wavelength range to which the human vision is insensitive. In this description, the radiation emitted from a light source will be sometimes simply referred to as "light" for the sake of simplicity. This term "light" does not have to be visible light but may also refer to any of various kinds of electromagnetic waves which can be detected by the image sensor.

Next, it will be described how the device described above measures the distance to the object.

Figure 4A:
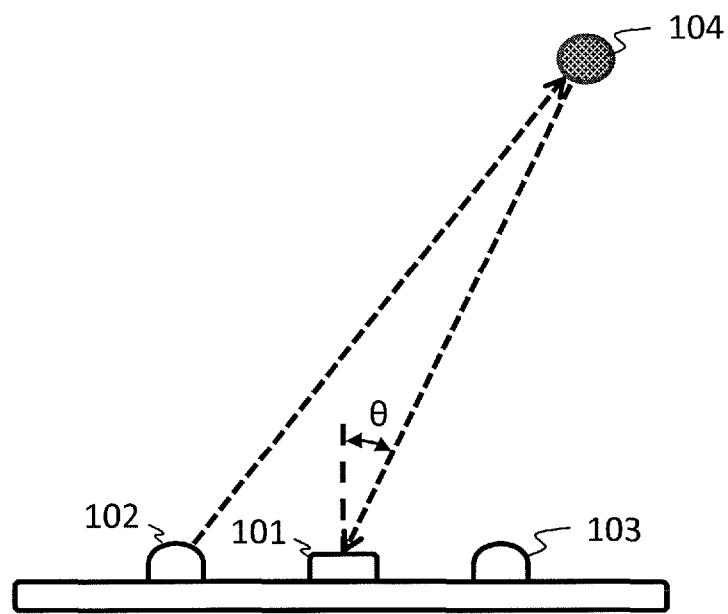
FIG. 4A Illustrates how an object 104 is irradiated with light that has been emitted from a first LED light source 102.
Figure 4B:
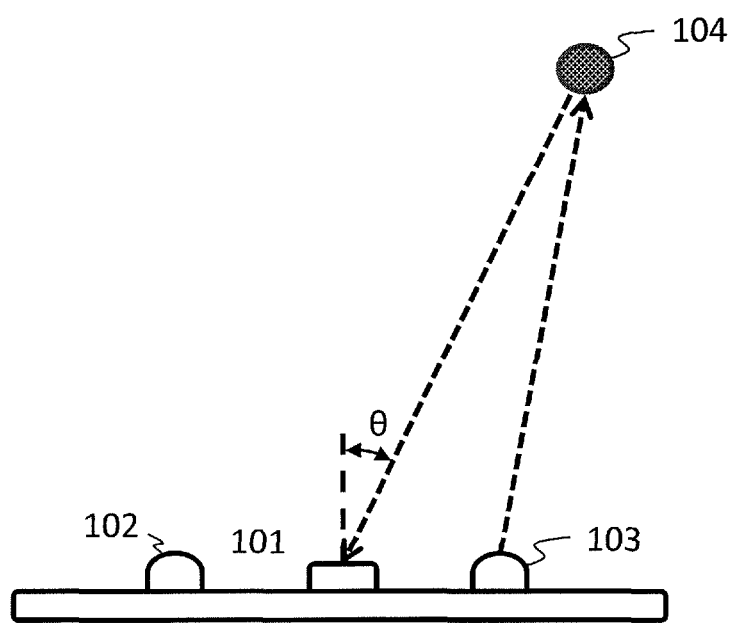
FIG. 4B Illustrates how an object 104 is irradiated with light that has been emitted from a second LED light source 103.

First of all, look at FIGS. 4A and 4B. FIG. 4A illustrates how the object 104 is irradiated with light that has been emitted from the first LED light source 102 and how part of the light reflected from the object 104 is incident on the image sensor 101. On the other hand, FIG. 4B illustrates how the object 104 is irradiated with light that has been emitted from the second LED light source 103 and how part of the light reflected from the object 104 is incident on the image sensor 101. The object 104 is supposed to be located at substantially the same position in both of FIGS. 4A and 4B.

At a first time, this device gets a first shooting session done by the image sensor 101 with the LED light source 102 turned ON and the LED light source 103 turned OFF as shown in FIG. 4A. Next, at a second time, the device gets a second shooting session done by the image sensor 101 with the LED light source 103 turned ON and the LED light source 103 turned OFF as shown in FIG. 4B. The durations (i.e., exposure times) of the first and second shooting sessions are supposed to be short enough to be able to handle the object 104 as substantially a still object.

When the first shooting session is carried out, part of the light emitted from the LED light source 102 is reflected from the object 104 and incident on the image sensor 101. As a result, a luminance image corresponding to the intensity of the light incident on the image sensor 101 is obtained. In the same way, when the second shooting session is carried out, part of the light emitted from the LED light source 103 is reflected from the object 104 and incident on the image sensor 101. As a result, a luminance image corresponding to the intensity of the light incident on the image sensor 101 is obtained.

The object's (104) luminance (which is either its luminance distribution or luminance image) can be obtained based on the two image frames captured as a result of the first and second shooting sessions. In this description, the "luminance" does not refer herein to a psychophysical quantity with the unit [candela/m$^2$] but refers herein to a "relative luminance" to be determined for each pixel of the image sensor and corresponds to the quantity of light or quantity of radiation. Each of the pixels that form each image frame has a "luminance value" corresponding to the quantity of light that the pixel has received.

Since the object 104 has its own size, each image representing the object 104 is usually comprised of multiple pixels. The "luminance" of the object 104 can be determined by various methods based on the luminance values of those pixels that form the object (104) image. For example, the luminance of the brightest "pixel" or "pixel block" of the object (104) image may be regarded as the luminance of the object 104. Or the average luminance of all pixels that form the object (104) image may be regarded as the luminance of the object 104.

Figure 5:
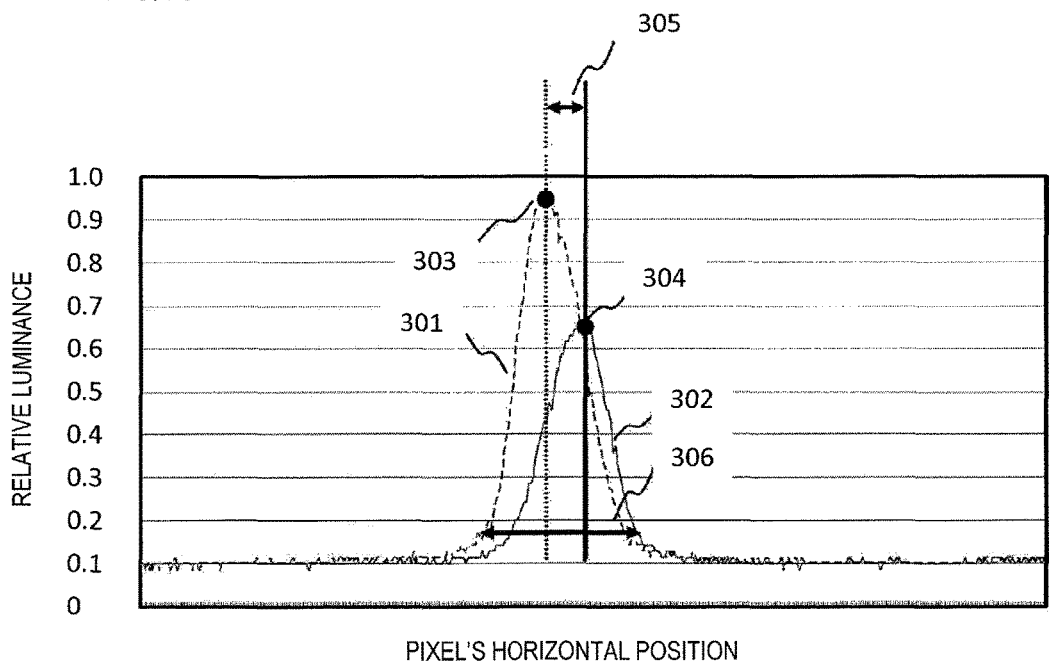
FIG. 5 A graph showing how the luminance of image capturing data changes with a pixel location on a line.

FIG. 5 is a graph showing the luminance value of a single horizontal line that runs across the object (104) image in each of the two image frames that have been obtained by the method described above. The abscissa indicates the location of a pixel on a particular horizontal line in the image, and the ordinate indicates the luminance. In this graph, the curve 301 represents the luminance when the LED light source 102 is ON, and the curve 302 represents the luminance when the LED light source 103 is ON.

In the example shown in FIG. 5, each of the curves 301 and 302 has a single peak. Specifically, the curve 301 has an extreme value 303 at a certain pixel location, and the curve 302 has an extreme value 304 at another pixel location. The horizontal interval between the respective coordinates of the extreme values 303 and 304 of the curves 301 and 302 is indicated by the width 305. Portions of the luminance curves 301 and 302 which have values greater than zero as indicated by the width 306 are caused by the light reflected from the object 104.

As described above, the object 104 is substantially standing still between the two frames. Thus, the difference is made between the curves 301 and 302 because the radiation produced by the LED light source 102 has a different pattern from the radiation produced by the LED light source 103. The ratio of the luminance of the image captured by making the light emitted from the LED light source 102 and then reflected from the object 104 be incident on the image sensor 101 to that of the image captured by making the light emitted from the LED light source 103 and then reflected from the object 104 be incident on the image sensor 101 depends on the relation between the distance from the LED light source 102 to the object 104 and the distance from the LED light source 103 to the object 104.

Figure 6:
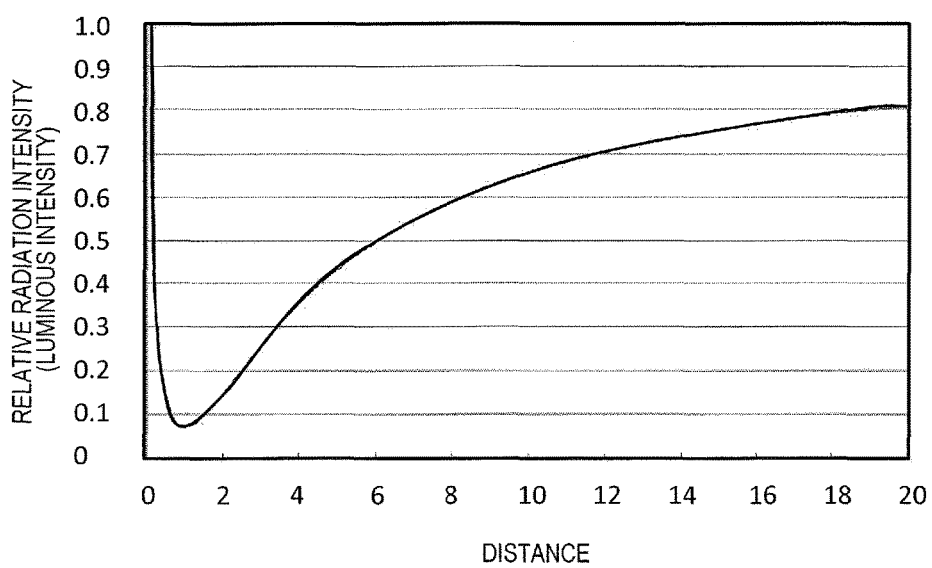
FIG. 6 A graph showing how the luminance ratio changes with the distance at a certain angle of radiation.

The distance to the object can be measured based on the ratio of the luminances of the images captured. FIG. 6 is a graph showing an exemplary relation between the distance and the luminance ratio in a direction which defines an angle of 45 degrees with respect to the image sensor 101. In the graph shown in FIG. 6, the abscissa indicates the relative distance to the object and the ordinate indicates the luminance ratio in a situation where LED light sources with the characteristic shown in FIG. 2 are arranged on the right- and left-hand sides at a predetermined distance from the image sensor 101. The "distance" on the axis of abscissas is measured based on the distance between the image sensor 101 and the LED light source, and a distance of "1" is equal to the distance between the image sensor 101 and the LED light source.

The object's luminance (or illuminance) attenuates inversely proportionally to the square of the distance from the LED light source to the object. Thus, the luminance ratio varies according to the distance. Since the radiation characteristic shown in FIG. 2 is already known, the distance can be detected or estimated accurately based on this radiation characteristic.

FIG. 6 shows an exemplary relation between the distance and the luminance ratio when the radiation angle θ is 45 degrees. The relations between the distance and the luminance ratio can be obtained in advance in the same way with respect to multiple different angles, too. The object's angle can be obtained based on the position of the object to be captured by the image sensor.

As can be seen from FIG. 6, if the distance between the object and the image sensor is longer than approximately one, the distance can be measured based on the ratio of the extreme values 303 and 304.

In the example described above, light sources, of which the relative radiation intensity changes with the radiation angle, are used. However, this measuring method can also be adopted even when light sources that do not have such a characteristic are used. Unless light sources which emit parallel light rays are used, the intensity of the light should have some light distribution characteristic in a three-dimensional space. That is why such light sources can also be used to measure the distance. For example, even in "point light sources" of which the light distributions are isotropic, the illuminance and luminance on the object also attenuate inversely proportionally to the square of the distance from the light sources. Thus, even such light sources can also be said to be light sources having different radiation patterns in a three-dimensional space.

Figure 7A:
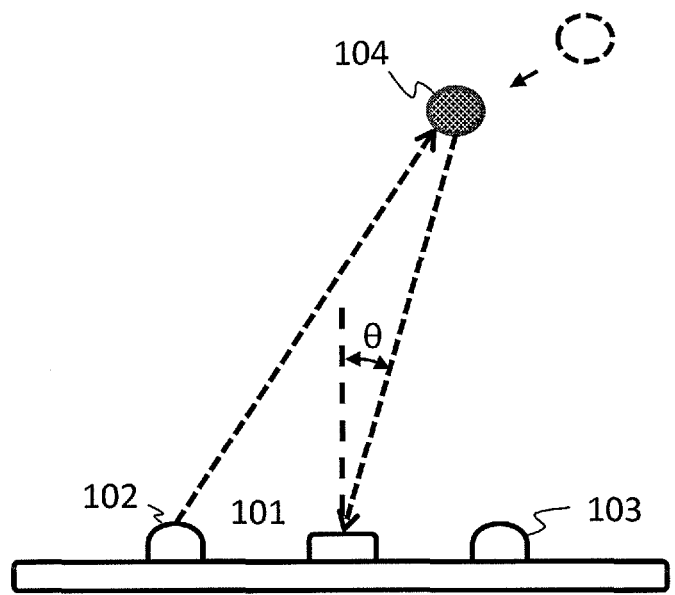
FIG. 7A Illustrates how an object 104 that has moved slightly is irradiated with the light emitted from the first LED light source 102.
Figure 7B:
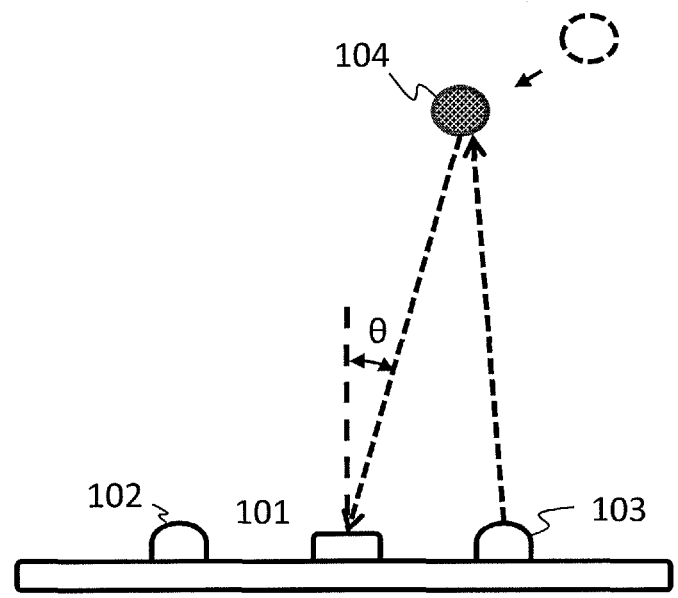
FIG. 7B Illustrates how the object 104 that has moved slightly is irradiated with the light emitted from the second LED light source 103.

Next, look at FIGS. 7A and 7B, which illustrate how a shooting session is performed on the object 104 that has moved from the position shown in FIGS. 4A and 4B. As long as an image can be captured and the distance can be estimated quickly, even the distance to a moving object can also be measured by the method described above. By illuminating the object with the light sources 102 and 103 alternately and capturing the object image using the image sensor 101 repeatedly a number of times, the position of the moving object 104 can be detected. As a result, the change in the position of the object 104, or its motion, can be detected.

The present inventors discovered that in a range where the distances from the two LED light sources 102 and 103 to the object 104 were equal to each other, the device described above could measure the distance less accurately. Such a range will be hereinafter referred to as a "low sensitivity range". If the distance on the axis of abscissas in the graph shown in FIG. 6 is equal to or smaller than one, the shorter the distance, the higher the luminance ratio gets. That is why the decision cannot be made, just by the luminance ratio, whether or not the object is located at a "close range" where the distance to the object is equal to or smaller than one.

Figure 8:
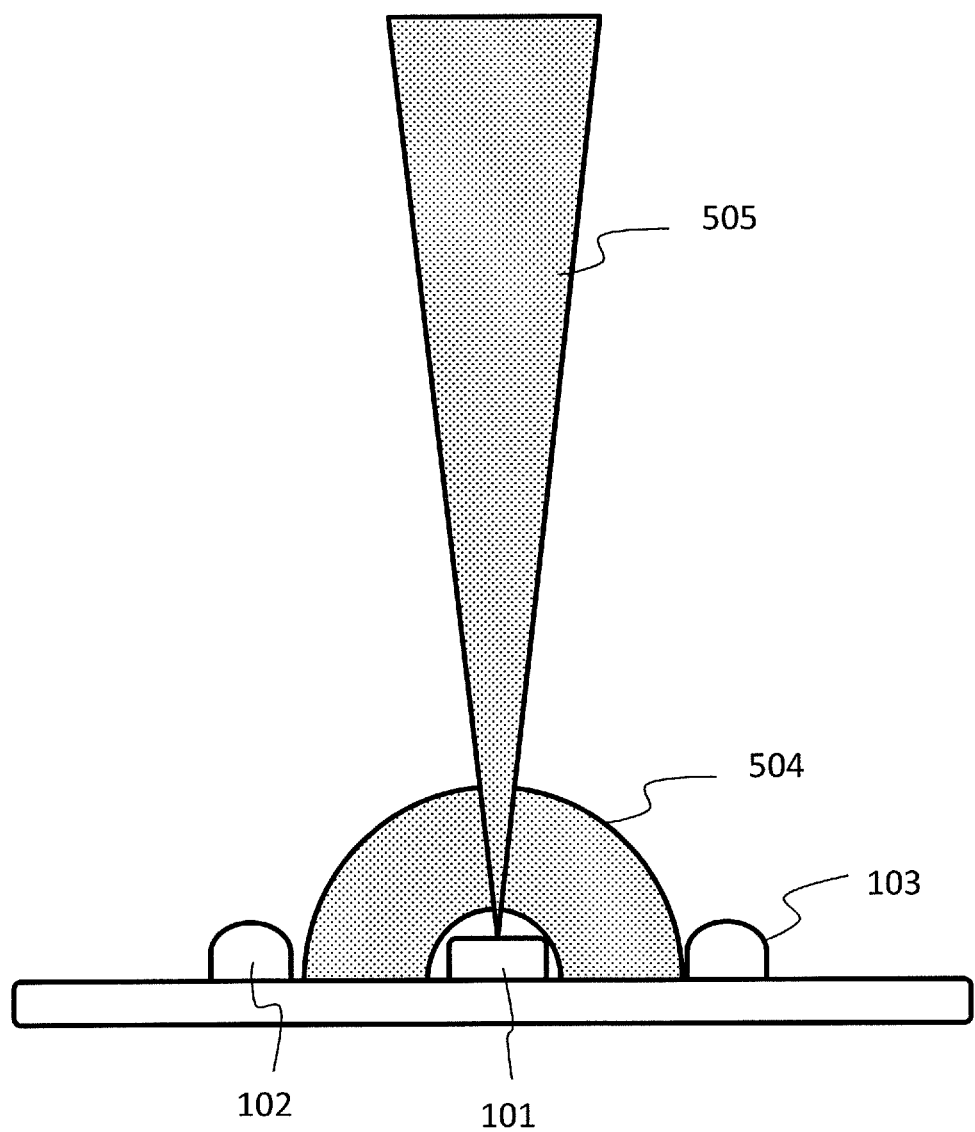
FIG. 8 Schematically illustrates a sensitivity range of a motion sensor device with two light sources.

FIG. 8 schematically illustrates low-sensitivity ranges for the device described above. In FIG. 8, illustrated are a low-sensitivity range 504 to be produced when the distance is too short and a low-sensitivity range 505 to be produced when the luminance ratio becomes close to one, irrespective of the distance.

According to embodiments of the present disclosure to be described below, it is possible to prevent the results of measurement from losing stability in those low-sensitivity ranges.

Embodiment 1

A first embodiment of a motion sensor device according to the present disclosure will be described. A motion sensor device according to this embodiment includes three light sources.

Figure 9A:
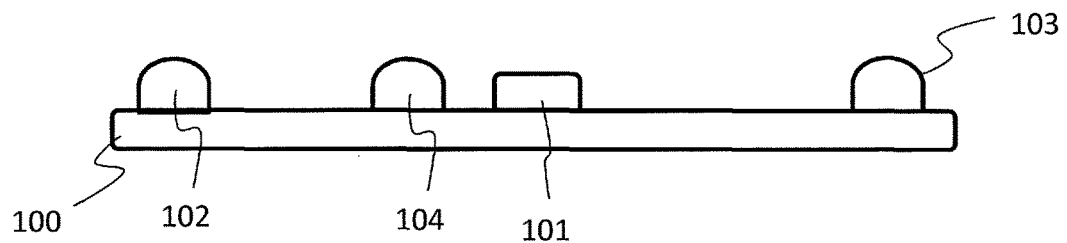
FIG. 9A Illustrates an arrangement of a light source unit and an image sensor in a first embodiment of the present disclosure.
Figure 9B:
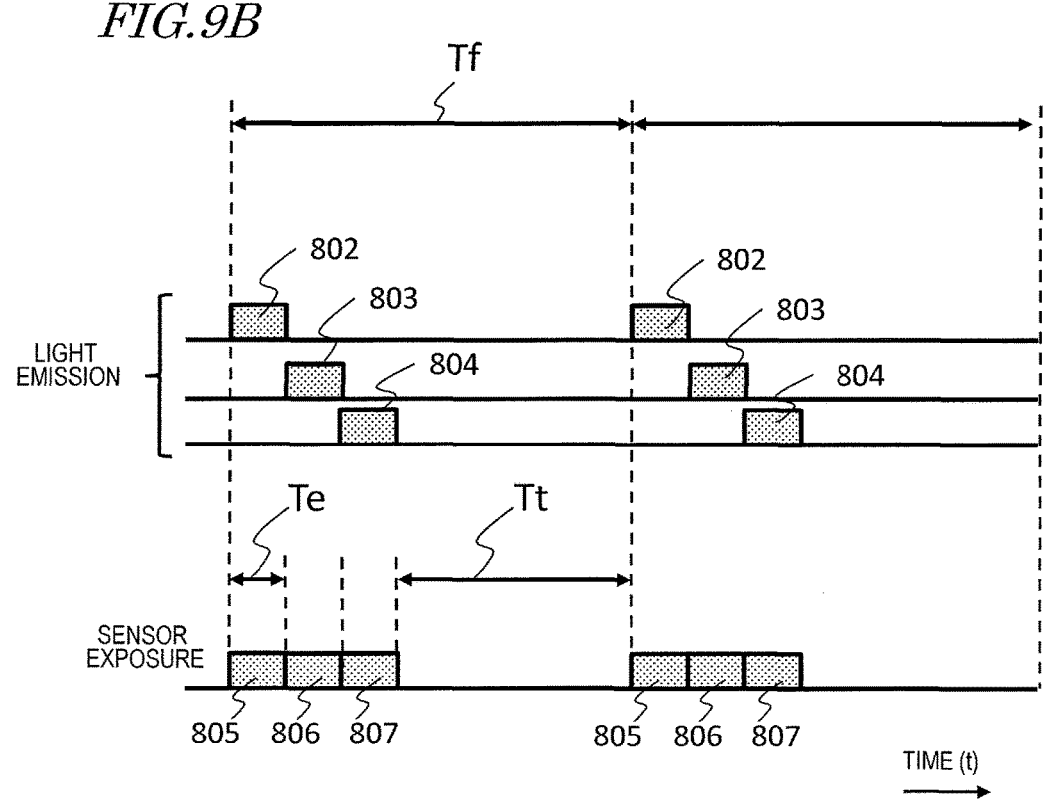
FIG. 9B A timing chart showing when the light sources and image sensor are activated in the first embodiment of the present disclosure.

FIG. 9A schematically illustrates an exemplary arrangement of light sources in a motion sensor device including three light sources. FIG. 9B is a timing chart showing the timings for this motion sensor device to control the light sources and the image sensor. First of all, it will be described with reference to FIGS. 9A and 9B why such a problem that the results of measurement would lose stability in the low-sensitivity ranges can be overcome by adopting the configuration of this embodiment.

The periods 802, 803 and 804 shown in FIG. 9B correspond to the periods in which the LED light sources 102, 103 and 104 are respectively turned ON. The first, second and third exposure periods 805, 806 and 807 correspond to the respective periods in which first, second and third frames are captured by the image sensor 101. Although the LED light sources 102, 103 and 104 are supposed to be turned ON in this order in the timing chart shown in FIG. 9B, the LED light sources may also be turned ON in any arbitrary order.

An ordinary image sensor captures a single frame per exposure process, has image data thus obtained retrieved by an external device, and then captures the next frame. That is to say, an image data reading operation is performed on a frame-by-frame basis. With such an image sensor, in the interval after an exposure process for the $n^{th}$ frame (where n is an integer) has been finished and before an exposure process for the $(n+1)^{th}$ frame is started, it will take some time to get the operation of transferring every electric charge obtained by capturing the $n^{th}$ frame and outputting it to an external device done.

On the other hand, according to this embodiment, as soon as the first exposure period 805 ends, the second exposure period 806 begins as shown in FIG. 9B. The electric charges of respective pixels which have been generated by capturing the first frame in the first exposure period 805 are transferred to, and stored in, a storage section before the second exposure period 806 begins. Likewise, as soon as the second exposure period 806 ends, the third exposure period 807 begins. The electric charges of respective pixels which have been generated by capturing the second frame in the second exposure period 806 are transferred to, and stored in, another storage section before the third exposure period 807 begins. After that, a signal representing the electric charges stored in those storage sections and the electric charges generated in the third exposure period 807 is read and output to an external device in the period Tt.

According to this embodiment, if the length of the first to third exposure periods is Te, the data of three image frames is retrieved at a rate to be determined by (1/Tf) which is the inverse number of Tf that is as long as 3×Te+Tt.

The period of time Tt varies depending on the number of pixels but may be set to be approximately 20 milliseconds with the data transfer rate taken into account. On the other hand, the period of time Te may be set to be as short as 1 millisecond or less, e.g., 25 microseconds. If three frames are captured continuously within a short period of time, even the distance to an object that is moving at high speeds (such as a person's fingertip) can also be measured. For example, if 3×Te is 75 microseconds, even an object that is moving at a speed of 1 meter per second will move only 0.075 millimeters while the first to third frames are captured. On the other hand, if those frames are captured at a normal frame rate (of 60 frames per second, for example), then the object will move as much as 50 millimeters in that period. Even if the object is shot at as high speeds as 1000 frames per second, the object will still move 3 millimeters in that period. Since the period of time after the first frame has started and until the third frame ends can be shortened to 3 milliseconds or less according to this embodiment, such a device can be used as a motion sensor device in various kinds of applications.

In this embodiment, the LED light source 104 is arranged closer to the image sensor 101 than any other light source is. The LED light sources 102 and 103 are arranged in mutually different directions (i.e., on the opposite sides) with respect to the image sensor 101. The respective distances from the image sensor 101 to the light sources 102 and 103 are longer than the distance from the image sensor 101 to the LED light source 104. The respective distances from the image sensor 101 to the light sources 102 and 103 may be either equal to each other or different from each other.

Figure 10A:
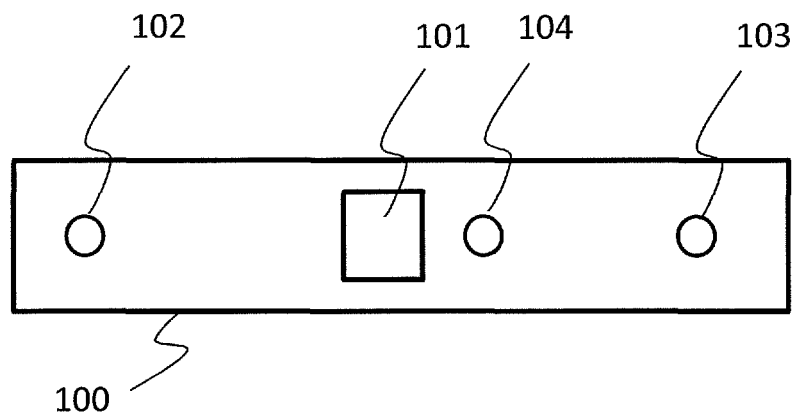
FIG. 10A A top view illustrating an exemplary arrangement according to the first embodiment of the present disclosure.
Figure 10B:
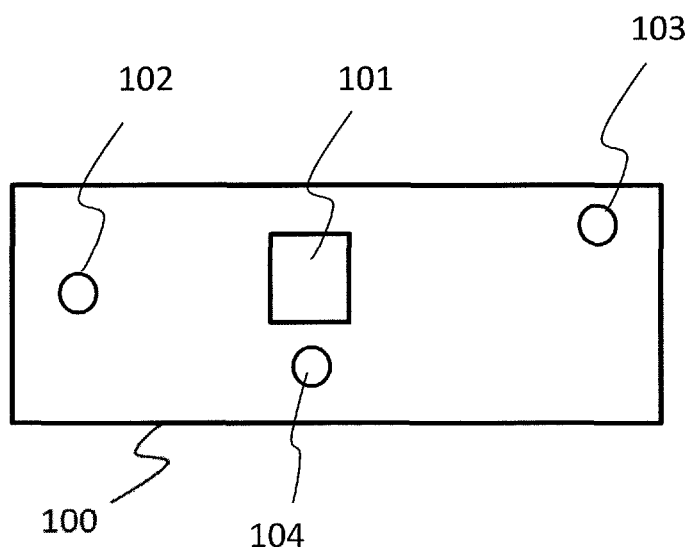
FIG. 10B A top view illustrating another exemplary arrangement according to the first embodiment of the present disclosure.

These light sources 102, 103 and 104 do not have to be arranged in line. FIGS. 10A and 10B are top views illustrating exemplary arrangements of the LED light sources 102, 103 and 104 and the image sensor 101. The LED light sources 102, 103 and 104 may be arranged in line as shown in FIG. 10A or may not be arranged in line as shown in FIG. 10B.

In the example shown in FIG. 10A, two light sources 103 and 104 are arranged in the same direction with respect to, but at mutually different distances from, the image sensor 101. If the two light sources 102 and 103 are arranged in the same direction with respect to the image sensor 101, the distances from the image sensor 101 to those light sources 102 and 103 will be different from each other. On the other hand, in the example shown in FIG. 10B, three light sources 102, 103 and 104 are arranged in mutually different directions with respect to the image sensor 101. If their directions are different in this manner, the distances from the image sensor 101 to these light sources 102, 103 and 104 do not have to be different from, but may be equal to, each other.

It should be noted that the light sources 102, 103 and 104 do not have to have the same height and same size but may have different heights or sizes. In addition, each of these light sources 102, 103 and 104 does not have to be a single LED chip, either. Alternatively, an LED array in which a number of LED chips are arranged may be used as each of these light sources. Furthermore, although not shown, optical members such as a lens and a filter may be arranged in each of these light sources 102, 103 and 104. The same can be said about the light sources of any of the other embodiments.

The distance to the object can be calculated as described above based on two out of the three images that have been gotten by capturing the first to third frames. There are three different combinations of two images that can be chosen from given three images. And the positions of the low-sensitivity range are different from each other in those three combinations. By using those two or three different pairs of images, the low-sensitivity range can be removed.

When one of those different combinations of light sources is chosen, the low-sensitivity range can be located automatically. That is why it can be determined, or at least presumed, by the object's azimuth, estimated distance and/or luminance ratio, that the object falls within the low-sensitivity range.

As for the LED light source 104 to be arranged near the image sensor 101, either its luminous intensity (radiation intensity) or luminous flux (radiant flux) value may be decreased or its radiation angle may be set to be a narrower one. Consequently, an inexpensive low-output LED light source can be used as the LED light source 104. And by adopting such a light source, an increase in the cost of parts and power dissipation can be checked. That is to say, according to this embodiment, just by adding a single LED light source of a relatively low price, a motion sensor device with less low-sensitivity range is realized.

In addition, according to this embodiment, by using a rather expensive image sensor which can capture three frames continuously, either the distance to an object that is moving at high speeds or the three-dimensional motion of such an object can be detected. If the motion velocity of the object that is the object of measurement is expected to be sufficiently low, an ordinary one-frame-exposure image sensor may be used.

Next, the configuration and operation of a motion sensor device according to this embodiment will be described in further detail with reference to FIGS. 11, 12 and 13.

Figure 11:
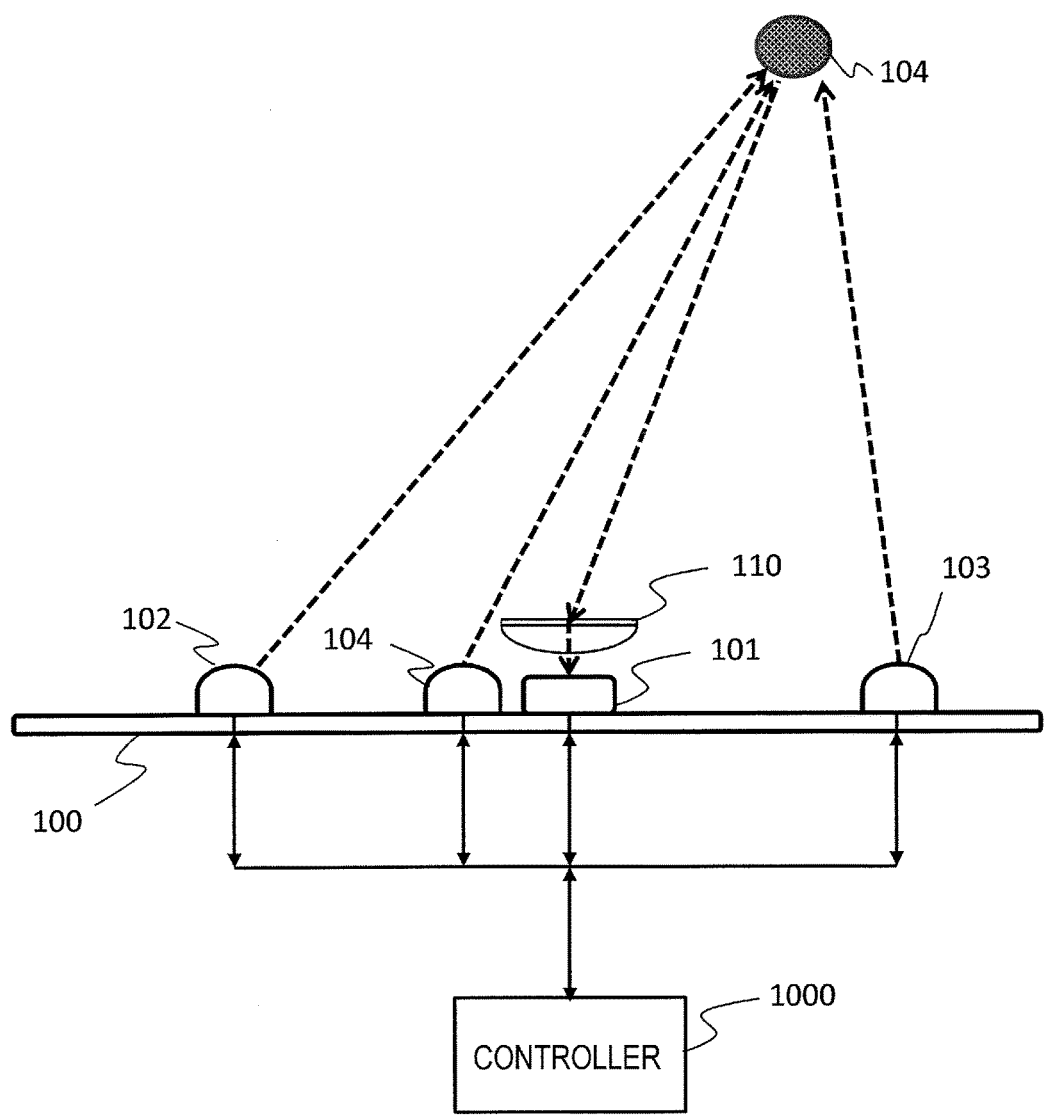
FIG. 11 Illustrates a configuration for a motion sensor device according to the first embodiment of the present disclosure.

FIG. 11 schematically illustrates a configuration for a motion sensor device according to this embodiment. This device includes an image sensor 101, a lens system 110 which produces a subject image on the imaging surface of the image sensor 101, three light sources 102, 103 and 104, and a controller 1000 which is configured to control the image sensor 101 and the light sources 102, 103 and 104. The image sensor 101 and light sources 102, 103 and 104 are mounted on a substrate 100. Part or all of the controller 1000 may be mounted on the substrate 100 or on another substrate. Alternatively, the function of the controller 1000 may be partially performed by a device which is arranged at a distant location.

According to this embodiment, by using the light sources 102 and 104, the distance to an object which is located just on the left-hand side of the image sensor 101 or anywhere on the right-hand side of the image sensor 101 can be measured with good stability. That is to say, when the luminance ratio by the light sources 102 and 104 is used, the low-sensitivity range is located on the left-hand side of the image sensor 101. Meanwhile, by using the light sources 103 and 104, the distance to an object which is located just on the right-hand side of the image sensor 101 or anywhere on the left-hand side of the image sensor 101 can be measured with good stability. That is to say, when the luminance ratio by the light sources 103 and 104 is used, the low-sensitivity range is located on the right-hand side of the image sensor 101. In this manner, by using the luminance ratio obtained by the light sources 102 and 104 and the luminance ratio obtained by the light sources 103 and 104, the distance can be detected with much more stability with the low-sensitivity range eliminated. It should be noted that this combination of light sources to obtain such luminance ratios that can be used effectively to eliminate the low-sensitivity ranges is just an example.

The image sensor 101 includes a storage section which temporarily stores electric charges on a pixel-by-pixel basis. Thus, even before image data obtained by capturing an $n^{th}$ frame is retrieved, an $(n+1)^{th}$ frame can be captured. If an increased number of storage sections are provided inside the image sensor 101, the exposure process can be carried out on three or more frames continuously. The image sensor 101 may be a special kind of sensor which can carry out the exposure process on even-numbered lines and on odd-numbered lines separately from each other.

The first light source 102 is arranged at a first distance from the image sensor 101 in a first direction. The second light source 103 is arranged at a second distance from the image sensor 101 in a second direction. The third light source 104 is arranged at a third distance from the image sensor 101 in a third direction. In this embodiment, the second and third directions are different from each other, so are the first and second distances. Also, in this embodiment, the light sources 102, 103 and 104 are all LED light sources.

The controller 1000 is configured to make the image sensor 101 capture a first frame with light emitted from the first light source 102 at a first time, make the image sensor 101 capture a second frame with light emitted from the second light source 103 at a second time, and make the image sensor 101 capture a third frame with light emitted from the third light source 104 at a third time. And the controller 1000 is configured to obtain information about an estimated distance to the object 104 based on multiple images generated by capturing the first to third frames.

Figure 12:
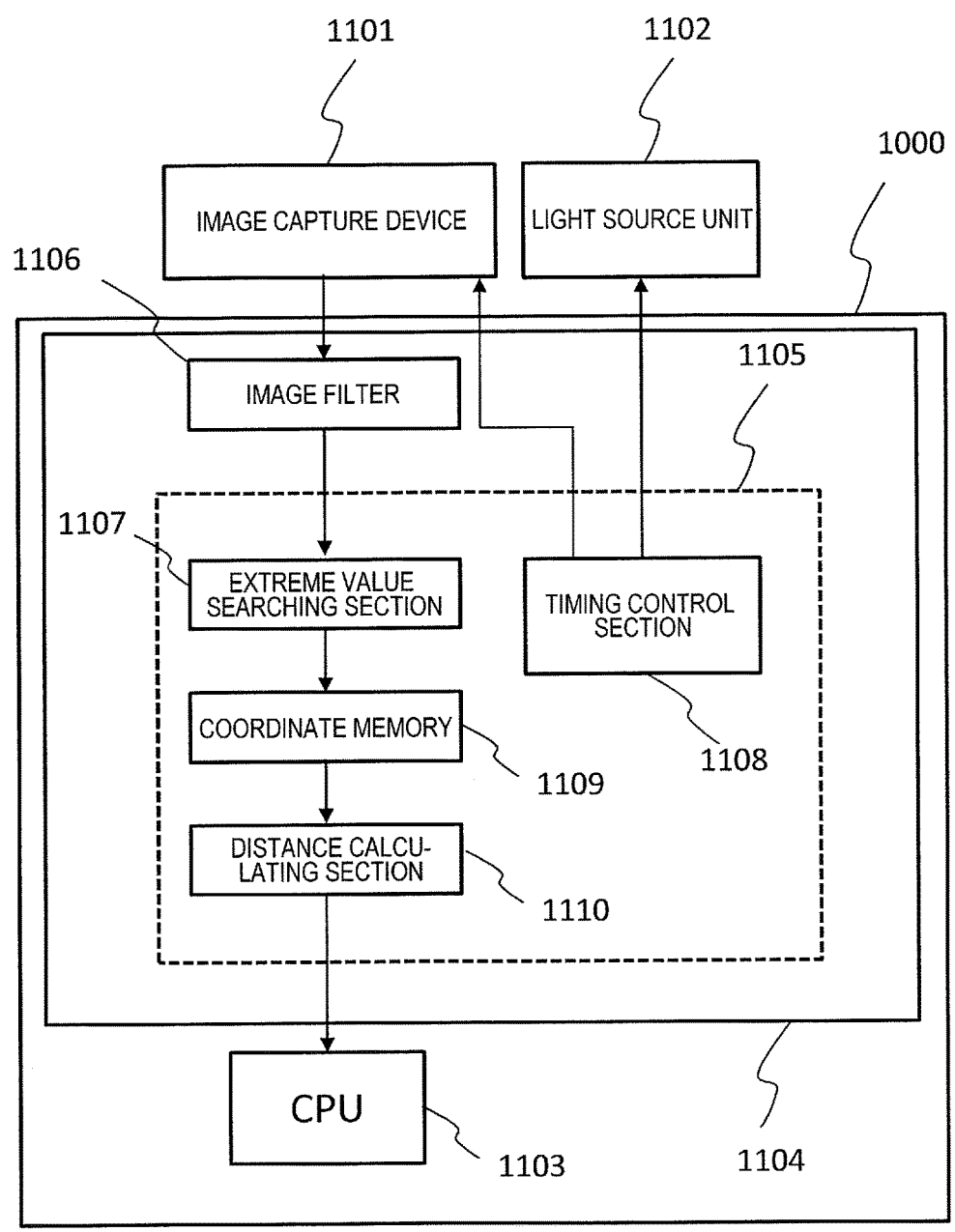
FIG. 12 A block diagram illustrating an exemplary configuration for a motion sensor device according to the first embodiment of the present disclosure.
Figure 13:
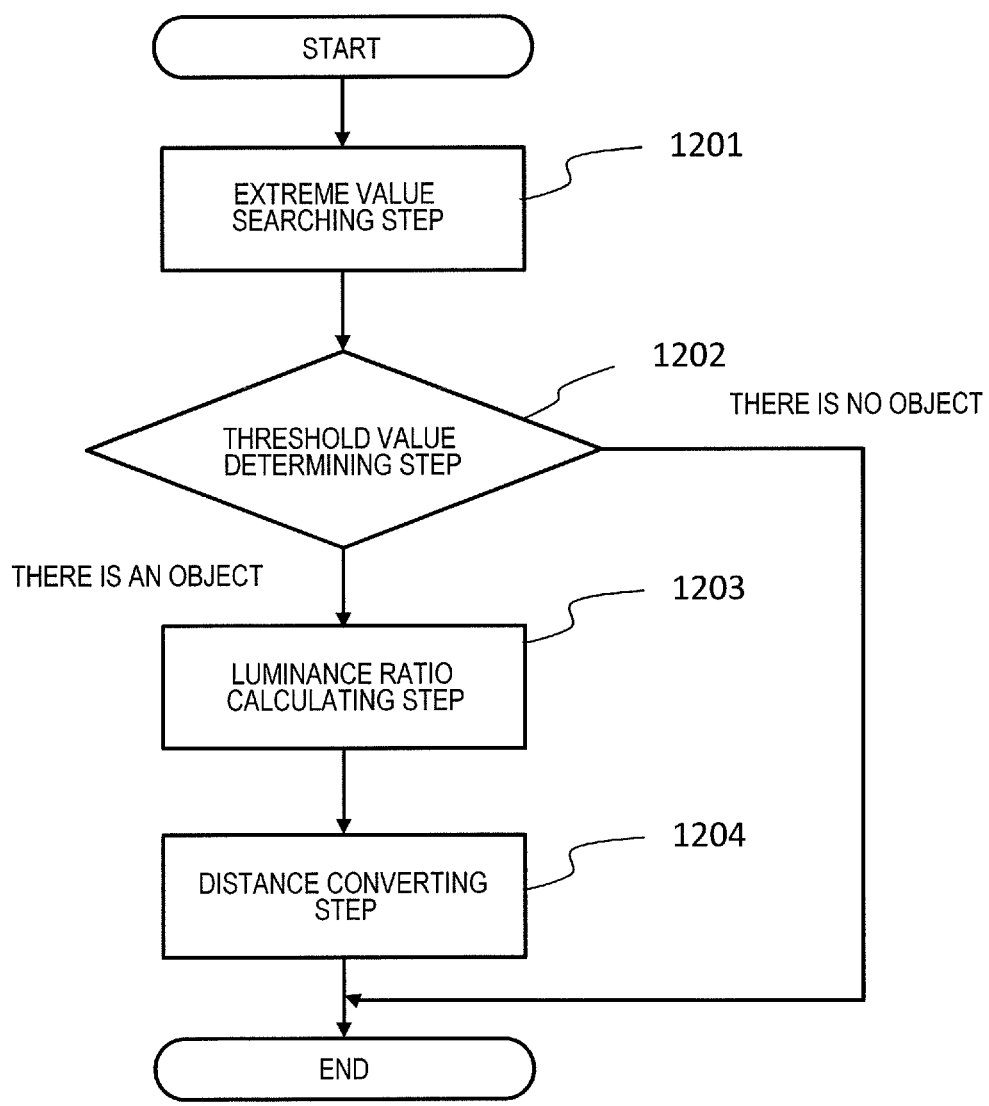
FIG. 13 A flowchart showing the procedure of calculating the distance according to the first embodiment of the present disclosure.

FIG. 12 is a block diagram illustrating an exemplary configuration for a motion sensor device according to this embodiment.

The image capture device 1101 is a single-lens image capture device and includes the image sensor 101 and lens system 110 shown in FIG. 11. The lens system 110 may be a set of lenses which are arranged on the same optical axis. The light source unit 1102 has a plurality of light sources including the light sources 102, 103 and 104 shown in FIG. 11.

The controller 1000 of this embodiment includes a CPU 1103 and a semiconductor integrated circuit 104, which includes a distance calculating block 1105 and an image filter block 1106. The distance calculating block 1105 includes an extreme value searching section 1107, a timing controller 1108, a coordinate memory 1109, and a distance calculating section 1110.

Each of the light sources 102, 103 and 104 of this embodiment is an LED light source, and satisfies the relation between the angle of radiation and the relative radiation intensity shown in FIG. 2. It should be noted that to carry out the present disclosure, the relative radiation intensity of these light sources 102, 103 and 104 does not have to change with the angle of radiation. Actually, however, many light sources have a relative radiation intensity which changes with the angle of radiation. That is why this point is taken into consideration according to this embodiment.

In this embodiment, the timing controller 1108 shown in FIG. 12 sends a signal instructing that the LED light source 102 be turned ON to the light source unit 1102. Meanwhile, the timing controller 1108 sends a signal instructing that an exposure process be carried out by the image sensor 101 to the image capture device 1101. In this manner, an image is captured in the first frame with the light source 102 turned ON and sent to the semiconductor integrated circuit 1104.

Next, the timing controller 1108 sends a signal instructing that the light source 103 be turned ON to the light source unit 1102. Meanwhile, the timing controller 1108 sends a signal instructing that an exposure process be carried out by the image sensor 101 to the image capture device 1101. In this manner, an image is captured in the second frame with the light source 103 turned ON and sent to the semiconductor integrated circuit 1104.

Subsequently, the timing controller 1108 sends a signal instructing that the light source 104 be turned ON to the light source unit 1102. Meanwhile, the timing controller 1108 sends a signal instructing that an exposure process be carried out by the image sensor 101 to the image capture device 1101. In this manner, an image is captured in the third frame with the light source 104 turned ON and sent to the semiconductor integrated circuit 1104.

In the semiconductor integrated circuit 1104, the image frame output from the image capture device 1101 is processed by an image filter block 1106. Although the image filter block 1106 is not an indispensable element, pre-processing such as noise reduction filtering is performed according to this embodiment by the image filter block 1106 when image processing is carried out.

The image processed by the image filter block 1106 is sent to the distance calculating block 1105, in which the image is processed by the extreme value searching section 1107. An example of the data processed by the extreme value searching section 1107 is as shown in FIG. 5, in which shown is the luminance of the captured image on a predetermined line. Although luminance distributions on the same line are shown in FIG. 5 with respect to two image frames, luminance distributions on the same line are obtained according to this embodiment with respect to three image frames. In other words, if two image frames are chosen from three image frames, two graphs, each of which is as shown in FIG. 5, can be obtained. For example, a graph such as the one shown in FIG. 5 can be drawn up based on first and second image frames. In the same way, a graph such as the one shown in FIG. 5 can also be drawn up based on second and third image frames.

The extreme value searching section 1107 searches first the range where objects to detect are present. There are many searching methods. For example, it is easy to search for luminance extreme values 303 and 304 based on the luminances 301 and 302 shown in FIG. 5. Alternatively, if an extreme value which is stabilized sufficiently with respect to motion needs to be obtained, it is possible to adopt a method in which a range where the luminance is equal to or greater than a certain value is detected and its center value is regarded as an extreme value.

Next, the extreme values 303 and 304 are regarded as having been obtained from the same object and paired with each other. In this case, two extreme values with close coordinates may be simply paired with each other. Or a range 306 in which the luminance is equal to or higher than a certain value may be located in advance based on the sum of the luminances 301 and 302 and may be searched for extreme values.

Check the difference between the luminances 301 and 302 shown in FIG. 5, and it can be seen that there is a range with a luminance level even though there is no difference there. However, as such a range exists probably because an out-of-system light source is present outside of this device, that range could be regarded as disturbance factor and removed. If cost permits, an image may be captured with every light source of this system turned OFF and that range may be removed. Even so, the same effect can also be achieved.

The extreme value searching section 1107 outputs the coordinates and extreme values of the object detected. The coordinates may be those of the center or barycenter of the range 306 or those of the middle point between the extreme values 303 and 304. Meanwhile, the extreme values 303 and 304 may be used as they are as the luminances according to one method, or an integral value of the range may be obtained according to another method.

In this description, one-dimensional data on a particular line has been described for the sake of simplicity. However, the one-dimensional line may be an axis other than the horizontal line for capturing an image. Alternatively, the coordinates and luminances of a range with a high relative luminance level may also be searched for two-dimensionally.

The coordinates and extreme values of the object that have been output from the extreme value searching section 1107 are stored in the coordinate memory 1109 and then sent to the distance calculating section 1110.

The distance calculating section 1110 calculates the distance based on the ratio of the luminances that have been obtained from the first and second image frames. First of all, based on the coordinates of the object, the distance calculating section 1110 determines in what azimuth the object is located with respect to the image sensor 101. This azimuth can be determined uniquely with the property of an optical system such as a lens taken into account.

Next, when it is known at what distance the object is located in that azimuth, the three-dimensional position of the object can be estimated.

The radiation characteristic of an LED light source that changes with its position such as the one shown in FIG. 6 mentioned above has been obtained in each azimuth. The data shown in FIG. 6 is based on the fact that the intensity of light decreases inversely proportionally to the square of the distance between an LED light source and the object. Also, in order to increase the accuracy, the angle defined by the object at each distance with respect to the LED light source is corrected in accordance with the radiation characteristic shown in FIG. 2. If the data shown in FIG. 6 is available, the distance to the object can be calculated based on the luminance ratio.

The data shown in FIG. 6 may be calculated by the distance calculating section 1110 through trigonometric function calculation. Alternatively, the data shown in FIG. 6 may also be calculated by storing, as a table, a graph which has been obtained in advance by calculation or measurement and complementing the graph as needed.

The results obtained by the distance calculating block 1105 are supplied to the CPU 1103 and used as 3D motion information there.

According to the configuration described above, processing can be advanced on the image data on a line-by-line basis. As a result, a motion sensor device which can detect the object in only one path with little latency is realizable.

The coordinates of the extreme values 303 and 304 do not always have to agree with each other. But as long as the material of the object is roughly uniform within the object area, these extreme values 303 and 304 can be used as the luminance ratio for calculating the distance. Optionally, the unit of measurement may be defined to be only the unit of an object with a certain width with attention paid to this property. According to this embodiment, the extreme values are searched for first, and then the distance is calculated based on the extreme values obtained. In this manner, the computations can get done more speedily with its complexity reduced significantly.

For example, in measuring the conditions of respective limbs of a human body, the extreme values of luminances of the respective regions that have been shot are obtained on an arm, leg or neck basis by reference to the data on a certain line. That is why compared to a method of calculating some distance at each pixel, the number of times of computations to get done can be reduced significantly.

Up to this point, the processing described above can get done with only the CPU and a software program. The processing flow of a software program to be executed in that case is shown in FIG. 13. This processing includes an extreme value searching step 1201, a threshold value determining step 1202, a luminance ratio calculating step 1203 and a distance converting step 1204.

In the extreme value searching step 1201, the image data is searched for a range with a relatively high luminance value (i.e., a range including an extreme value). Next, in the threshold value determining step 1202, the decision is made whether or not the given object is the object to be tracked in the extreme value searching step 1201. If the luminance or size of the range is equal to or smaller than a certain value, then the decision is made that "there is no object" and the data is regarded as noise and discarded. This threshold value determining step 1202 is not an indispensable step but is generally an important step to increase the robustness. On the other hand, if the decision made in the threshold value determining step 1202 is that "there is an object", then associated extreme values are paired with each other to calculate the luminance ratio. Subsequently, in the distance converting step 1204, the extreme values are converted into a distance based on the luminance ratio and the image capturing position.

Alternatively, this function can also be performed by storing a program defining the procedure described above on a magnetic recording medium or a semiconductor storage medium, for example, and getting the program done by the CPU.

According to this embodiment, by scanning the image only once in the extreme value searching step 1201, the luminance value and coordinates to be the object of calculation can be picked up. That is why by adopting this procedure, the computations can get done speedily.

The motion sensor device of this embodiment can be used in various applications. For example, by applying this motion sensor device to a camcorder, movie autofocusing can be controlled quickly. In addition, by recognizing respective fingers of a human being from a short distance or his or her body or limbs from a long distance, this device can also be used as a gesture recognizing motion sensor device.

Although the light sources are supposed to be LED light sources in the embodiment described above, this is only an example of the present disclosure. Alternatively, any other kind of light sources may also be used as long as the light sources have radiation patterns, of which the light intensities are different from each other in a three-dimensional space. The wavelengths of the light sources do not have to fall within the visible radiation range but may also fall within an infrared range or any other wavelength range.

The image sensor may be, but does not have to be, a CMOS image sensor or a CCD image sensor. The number of light sources to provide may be four or more. And the number of image capturing sessions to perform continuously does not have to be three but may also be four or more.

Embodiment 2

A second embodiment of a motion sensor device according to the present disclosure will be described. The motion sensor device of this embodiment includes four light sources. The device of this embodiment also includes the lens system 110 and controller 1000 with the same configurations as the ones already described with reference to FIG. 11. Thus, description thereof will be omitted herein to avoid redundancies.

Figure 14A:
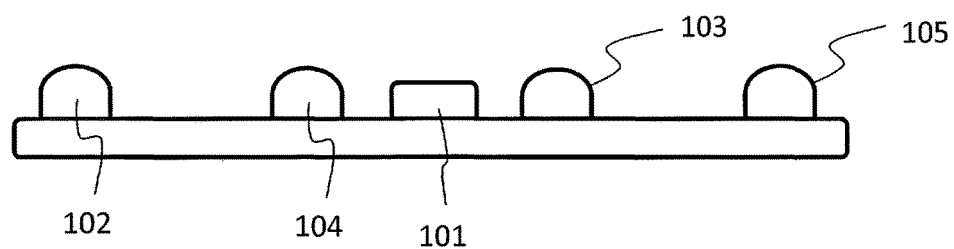
FIG. 14A Illustrates an arrangement of a light source unit and an image sensor in a second embodiment of the present disclosure.
Figure 14B:
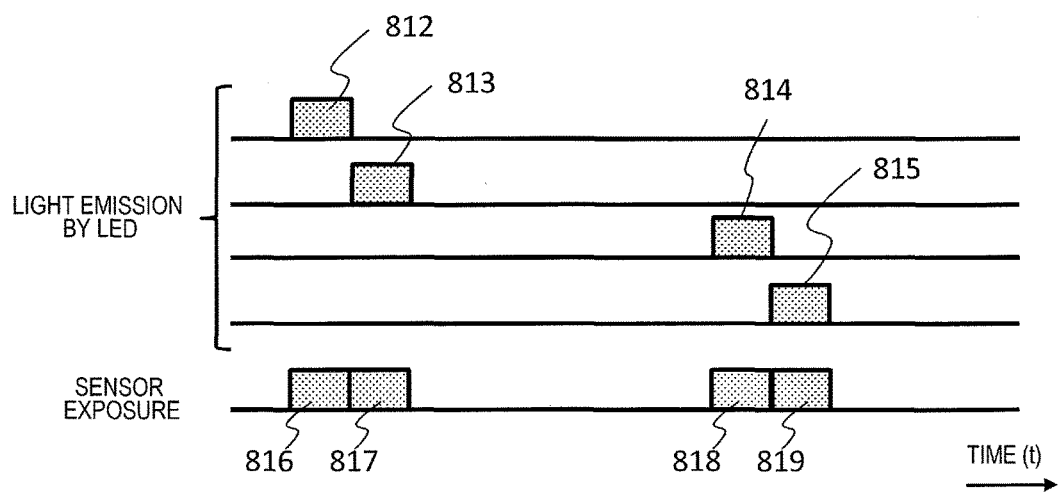
FIG. 14B A timing chart showing when the light sources and image sensor are activated in the second embodiment of the present disclosure.

FIG. 14A illustrates an arrangement of light sources in the motion sensor device of this embodiment. FIG. 14B is a timing chart showing the timings for this motion sensor device to control the light sources and the image sensor.

As shown in FIG. 14B, the periods 812, 813, 814 and 815 correspond to the periods in which the LED light sources 102, 103, 104 and 105 are respectively turned ON. The first, second, third and fourth exposure periods 816, 817, 818 and 819 correspond to the respective periods in which first, second, third and fourth frames are captured by the image sensor 101.

Although the LED light sources 102, 103, 104 and 105 are supposed to be turned ON in this order in the timing chart shown in FIG. 14B, the LED light sources may also be turned ON in any arbitrary order.

In this embodiment, the LED light sources 103 and 104 are arranged relatively close to the image sensor 101. The LED light sources 102 and 103 are arranged in two different directions with respect to the image sensor 101. Likewise, the LED light sources 104 and 105 are also arranged in two different directions with respect to the image sensor 101. The distance from the image sensor 101 to the LED light source 102 is different from the distance from the image sensor 101 to the LED light source 103. Likewise, the distance from the image sensor 101 to the LED light source 104 is also different from the distance from the image sensor 101 to the LED light source 105.

In this embodiment, four LED light sources are used. The image sensor 101 has the ability to perform an exposure process on two frames continuously. This embodiment can be implemented using a less expensive image sensor than the device of the first embodiment.

Although the image sensor 101 of this embodiment has the ability to perform an exposure process on two frames continuously, the same system can also be established even with an image sensor with the ability to perform an exposure process on only one frame continuously if the system is supposed to be used only when the object of measurement is moving at a sufficiently low velocity, for example.

In this embodiment, a luminance ratio is obtained based on an image gotten by capturing first and second frames, and the distance to the object is obtained (as a first estimated distance) by the method described above. Also, a luminance ratio is obtained based on an image gotten by capturing third and fourth frames, and the distance to the object is obtained (as a second estimated distance) by the method described above. In this embodiment, the operation of transferring electric charges and outputting the charges to an external device is performed in an interval between two points in time when the second and third frames are respectively captured. That is why if the object moves after the first estimated distance has been obtained and before the second estimated distance is obtained, the distance may increase in the meantime. However, if the object is moving at a low velocity, the first and second estimated distances would essentially be approximately equal to each other. Since the arrangement of two light sources when the first estimated distance is obtained is different from the arrangement of two light sources when the second estimated distance is obtained, the low-sensitivity ranges according to the respective light source arrangements do not overlap with each other. Consequently, according to this embodiment, the distance to the object can be estimated more accurately based on those multiple estimated distances.

Embodiment 3

A third embodiment of a motion sensor device according to the present disclosure will be described. The motion sensor device of this embodiment includes two light sources which are arranged asymmetrically with respect to an image sensor. The device of this embodiment also includes a lens system 110 and a controller 1000 with the same configuration as their counterparts of the embodiment that has already been described with reference to FIG. 11. Thus, description thereof will be omitted herein.

Figure 15A:
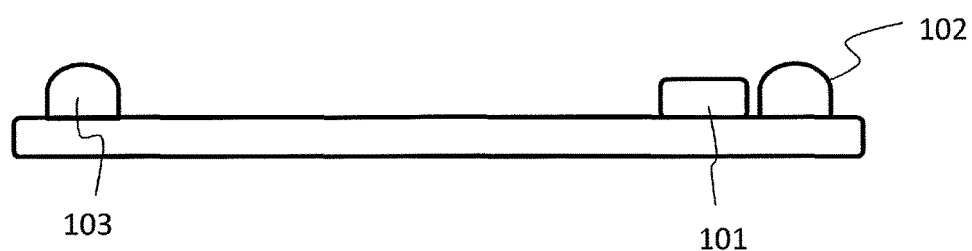
FIG. 15A Illustrates an arrangement of a light source unit and an image sensor in a third embodiment of the present disclosure.
Figure 15B:
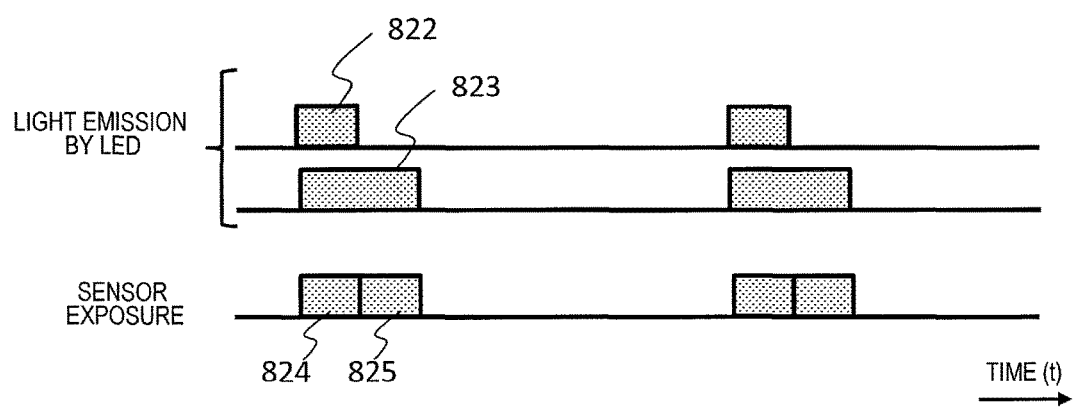
FIG. 15B A timing chart showing when the light sources and image sensor are activated in the third embodiment of the present disclosure.

FIG. 15A illustrates an arrangement of light sources in the motion sensor device of this embodiment. FIG. 15B is a timing chart showing the timings for this motion sensor device to control the light sources and the image sensor.

In the example shown in FIG. 15A, two light sources 102 and 103 are arranged in two different directions with respect to, and at mutually different distances from, the image sensor 101. However, these two light sources 102 and 103 may also be arranged in the same direction with respect to the image sensor 101. If the two light sources 102 and 103 are arranged in the same direction with respect to the image sensor 101, the distances from the image sensor 101 to those light sources 102 and 103 will be different from each other.

As shown in FIG. 15B, the period 822 corresponds to a period in which both of the LED light sources 102 and 103 are turned ON, and the period 823 corresponds to a period in which only the LED light source 103 is turned ON. The first and second exposure periods 824 and 825 correspond to the respective periods in which first and second frames are captured by the image sensor 101.

This embodiment is characterized in that the LED light source 103 emits light in both of the first and second exposure periods 824 and 825.

Figure 16:
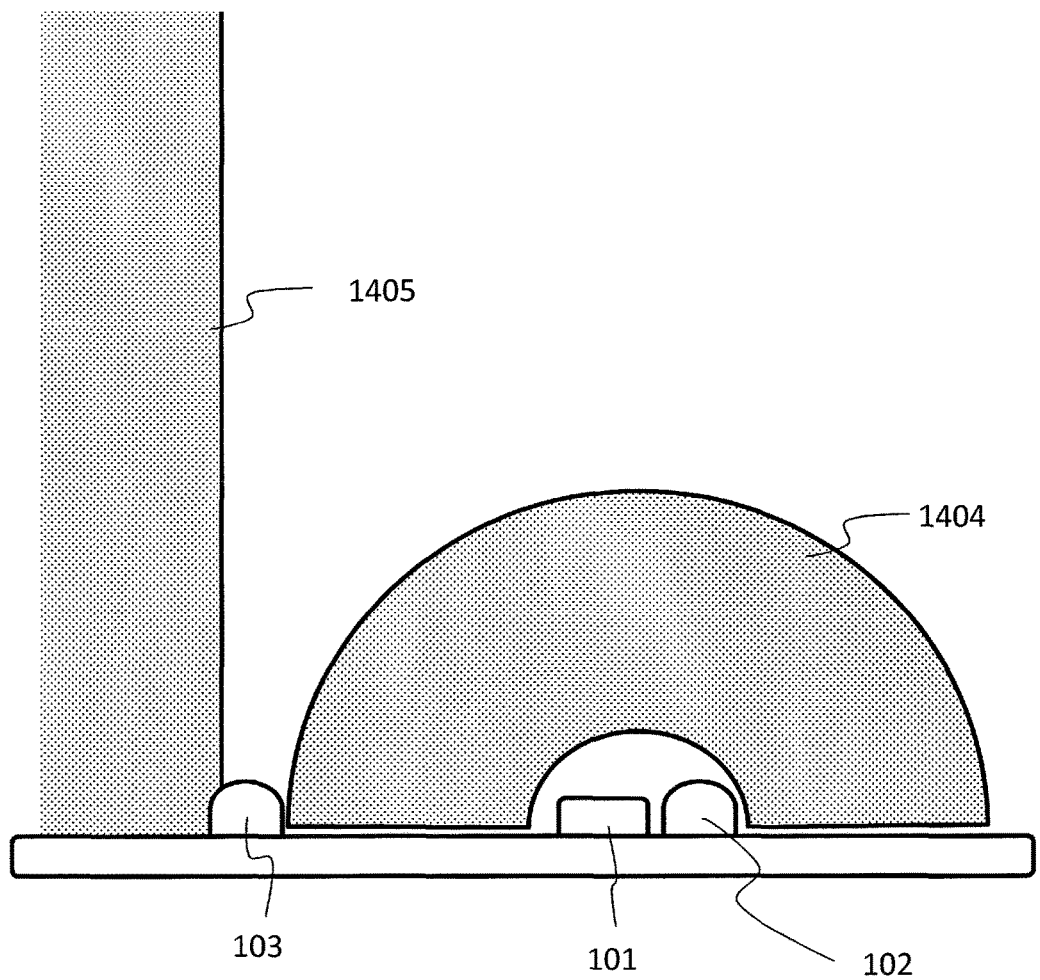
FIG. 16 Schematically illustrates a sensitivity range of a motion sensor device according to the third embodiment of the present disclosure.

FIG. 16 illustrates sensitivity ranges generated in this embodiment. In FIG. 16, illustrated are a high-sensitivity range 1404 and a low-sensitivity range 1405.

The high-sensitivity range 1404 is a range in which the more distant from the image sensor 101, the more significantly the luminance ratio changes. On the other hand, the low-sensitivity range 1405 is a range in which the luminance ratio changes in reverse direction compared to the high-sensitivity range 1404 and the distance cannot be measured accurately.

By making the LED light source 103 emit light in both of the two exposure periods, the low-sensitivity range can be shifted toward the LED light source 103, not between the LED light sources 102 and 103, as shown in FIG. 16. As a result, the high-sensitivity range 1404 can be located in a central region in which the image sensor 101 has a high image capturing resolution.

In this embodiment, only two LED light sources are used, and the image sensor 101 has the ability to perform an exposure process on two frames continuously.

Although the LED light source 103 is supposed to emit light in both of the two exposure periods in the embodiment described above, this role may be played by not only the LED light source 103 but also another LED light source provided additionally. By getting emitted light distributed in this manner, the heat dissipation property of the LED light sources may be improved in some cases.

One of important features of this embodiment is to turn ON simultaneously multiple light sources located at different positions during an exposure period in which an exposure process is carried out time-sequentially. As a result, the low-sensitivity range can be shifted. If multiple light sources can emit light simultaneously, then the number of light sources to provide may be three or more.

Figure 17:
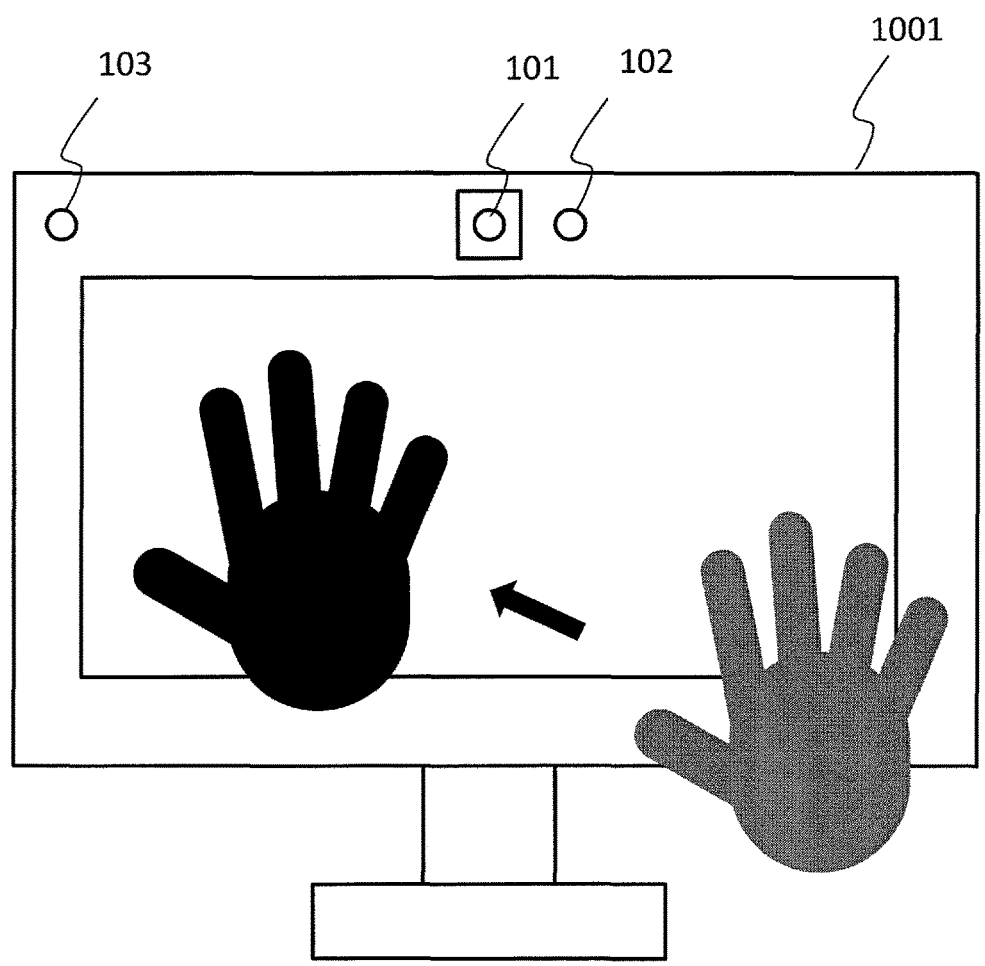
FIG. 17 Illustrates an exemplary product in which a motion sensor device according to the third embodiment of the present disclosure is built.

FIG. 17 illustrates a display 1001 with a motion sensor device according to this embodiment. In the example shown in FIG. 17, a high-sensitivity range of the motion sensor device is formed around the image sensor 101 on the right-hand side of the LED light source 103. That is why a gesture input can be made toward the center of the display 1001. In FIG. 17, illustrated schematically is a hand making the gesture input for your reference. The hand illustrated in FIG. 17 is moving in the direction indicated by the arrow. As shown in FIG. 16, the low-sensitivity range 1405 is located on the left-hand side of the light source 103. In the display shown in FIG. 17, the light source 103 is arranged around the left corner edge of the screen, and therefore, the low-sensitivity range 1405 is located outside of an area in which a gesture input is ordinarily made.

If the motion sensor device of this embodiment is applied to a display, for example, the device can be used as a user interface which allows the user to change channels with a gesture input. The display changes what to present thereon in response to an object's motion. This motion sensor device is also applicable to a dance game to recognize the motion of respective limbs of a human being.

According to this embodiment, only a few LED light sources and just the ability to perform an exposure process on two frames are required.

Optionally, a motion sensor device according to any other embodiment may be built in the display shown in FIG. 17.

Embodiment 4

A fourth embodiment of a motion sensor device according to the present disclosure will be described. The motion sensor device of this embodiment also includes two light sources. The device of this embodiment also includes a lens system 110 and a controller 1000 with the same configuration as their counterparts of the embodiment that has already been described with reference to FIG. 11. Thus, description thereof will be omitted herein.

According to this embodiment, decision is made whether or not the object of measurement falls within the low-sensitivity range.

Now take a look at FIG. 8 again. The low-sensitivity range 505 shown in FIG. 8 can be determined by coordinates in an image captured by the image sensor 101 (which will be hereinafter referred to as "image capturing coordinates"). In the example illustrated in FIG. 8, the closer to the center of the image, the lower the luminance ratio, and therefore, the lower the degree of reliability.

Next, it will be described how to detect a low-sensitivity range 504 which is located at a short distance from the image sensor 101.

As described above, the extreme value searching section 1107 shown in FIG. 12 can search for and find the extreme values 303 and 304. There is a difference in coordinate between these extreme values 303 and 304. This is because when an object is irradiated with light beams emitted from light sources located at different positions, the difference in their angle of irradiation causes such a coordinate difference in the high-sensitivity range. This coordinate difference can be used as it is to a certain degree. This coordinate difference depends on not only the distance to the object but also the size of the object as well. That is why if the coordinate difference is corrected with the size of the range 306, the distance can be estimated highly accurately. Specifically, by dividing the object's luminance by the size of the range 306, a value which is strongly correlated with the distance can be obtained. According to this method, the distance to an object which is located close to the image sensor 101 can be estimated.

The more distant the object is, the lower its luminance ratio gets. That is why the luminance ratio itself can be used to estimate the distance. In the case of a moving object, if the luminance and size are stored in association with each other when the object is located in a range where the degree of reliability is high in terms of the luminance ratio, the object will still be trackable with those pieces of information even after the object has moved to a low-sensitivity range.

By adopting any of these distance estimating methods, decision can be made whether or not the object is located within the low-sensitivity range 504.

If the decision has been made by the method described above that the object falls within the low-sensitivity range, then the distance estimated based on the luminance ratio can be regarded as "having no reliability".

Next, it will be described how to use the degree of reliability.

First of all, by discarding estimated distance data with a low degree of reliability, tracking the object in the low-sensitivity range can be stopped. It will be handier for the user to stop sensing altogether rather than obtaining erroneous distance data.

Optionally, estimated distance data with a low degree of reliability and distance information collected by another method may be merged together or replaced with a weight added thereto.

Next, another method for obtaining distance information using a light source and an image sensor will be described. In the example to be described below, the TOF (Time of Flight) method is adopted. According to the TOF method, any of various configurations and emitting methods may be used. In the following example, an exemplary TOF method which uses a pulse light source will be described with reference to FIGS. 18 and 19.

Figure 18:
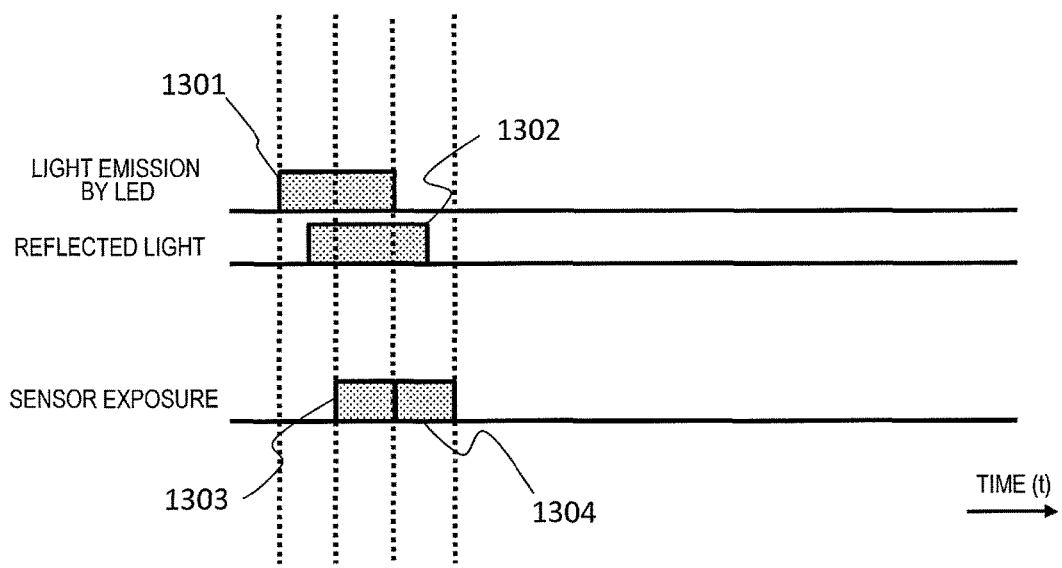
FIG. 18 A timing chart showing when the light sources and image sensor are activated in a fourth embodiment of the present disclosure.

FIG. 18 shows an LED light source's emission period 1301, a period 1302 that it takes for the light that has been incident on and reflected from an object to reach the sensor, and the image sensor's first and second exposure periods 1303 and 1304.

Suppose the light emitted from an LED light source is reflected from the surface of an object which is located at a distance of 1.5 m from an image sensor and then incident at a pixel on the image sensor. In that case, the reflected light reaching period 1302 that it takes for the reflected light to reach a pixel on the image sensor has a delay of 10 ns with respect to the LED light source's emission period 1301, because the velocity of light is finite.

Suppose the luminances of pixels exposed in the exposure periods 1303 and 1304 are first and second luminances, respectively. In that case, by dividing the second luminance by the first luminance, the time delay of the reflected light can be measured. As a result, the distance can be calculated as well.

Figure 19:
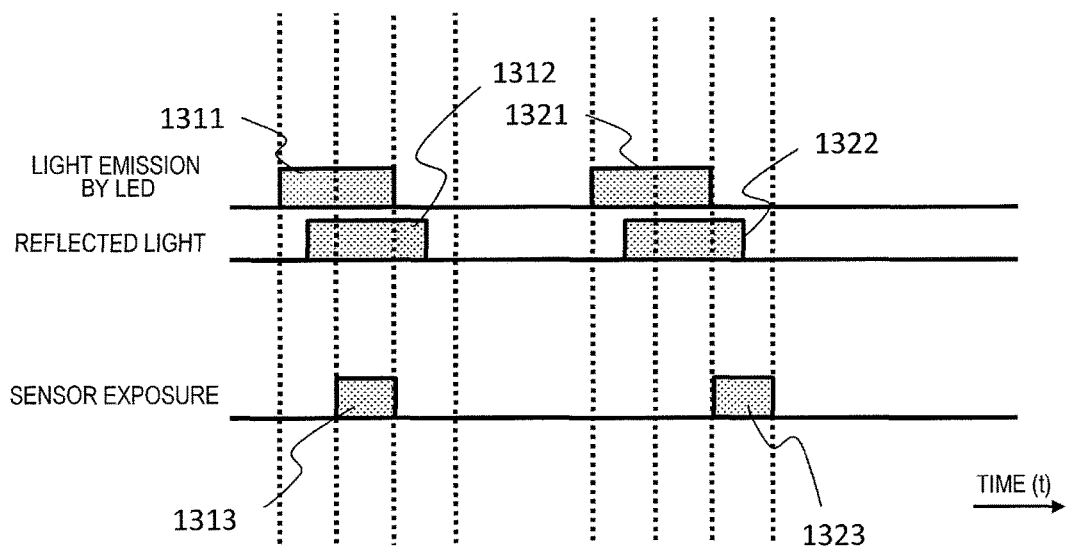
FIG. 19 A timing chart showing when the light sources and image sensor are activated in the fourth embodiment of the present disclosure.

In the example shown in FIG. 19, a certain interval is left between sensor exposure periods. The periods 1312 and 1322 that it takes for the light that has been incident on and reflected from the object to reach the sensor are slightly delayed with respect to LED light source's emission periods 1311 and 1321. This delay is caused due to the distance to the object. First and second luminances are obtained in the image sensor's first and second exposure periods 1313 and 1323, respectively. According to the TOF method, if the distances are substantially equal to each other for an object falling within the measuring range, the LED light source to be activated in the light emission period 1311 may be different from the LED light source to be activated in the light emission period 1321. That is why as long as such a procedure is adopted, the measurement can be carried out on the same captured frame at the same time using the same light source and same image sensor, no matter whether the TOF method or the luminance-ratio-based method of the present disclosure is adopted.

In measuring the distance by the TOF method, actually the quantity of light available will be insufficient if the exposure process is performed only once, and therefore, iterative exposure values are accumulated by performing the same operation over and over again. Even if such an operation is performed, however, the luminance ratio of the present disclosure is not affected. Also, since the accuracy cannot be improved if the TOF distance measuring method is applied to a short distance, it is effective to combine the TOF distance measuring method with this embodiment of the present disclosure.

A motion sensor device according to various embodiments of the present disclosure can reduce errors in measuring the distance and can operate much more quickly. A 3D motion sensor device according to the present disclosure can be used in applications in which detection needs to be done in real time.

Optionally, some of the functions of a motion sensor device according to the present disclosure may be performed by another device which is connected to the former device through a wired or wireless network.

INDUSTRIAL APPLICABILITY

An embodiment of a motion sensor device according to the present disclosure has the ability to measure the three-dimensional position of an object in real time, and therefore, can be used effectively as a non-contact gesture user interface for a display device and various other kinds of electronic devices. In addition, this motion sensor device may also be used as a car device to monitor the state of person(s) inside the car and persons outside of the car and to detect any obstacles. Furthermore, the motion sensor device can also be used in autofocusing for a camcorder.

REFERENCE SIGNS LIST 101 image sensor
102, 103 LED light source
301, 302 luminance
303, 304 extreme value
305 coordinate difference between extreme luminance values
306 range
504, 505, 1405 low-sensitivity range
802, 803, 804, 812, 813, 814, 815, 822, 823 emission period
805, 806, 807, 816, 817, 818, 819, 824, 825 exposure period
1001 display device
1101 image capture device
1102 light source unit
1103 CPU
1104 semiconductor integrated circuit
1105 distance calculating block
1106 image filter block
1107 extreme value searching section
1109 coordinate memory
1110 distance calculating section
1301, 1311, 1321 emission period
1302, 1312, 1322 reflected light reaching period
1303, 1304, 1313, 1323 exposure period
1404 high-sensitivity range

The invention claimed is:

1. A motion sensor device comprising:
an image sensor capable of performing an exposure process on a plurality of frames continuously without allowing image data of the frames to be retrieved;
a first light source being arranged at a first distance from the image sensor in a first direction;
a second light source being arranged at a second distance from the image sensor in a second direction, the second direction being different from the first direction, the second distance being different from the first distance; and
a controller configured to control the image sensor and the first and second light sources without controlling any other light source than the first and second light sources,
wherein:
the controller is configured to:
make the image sensor capture a first frame with light emitted from the first light source at a first time;
make the image sensor capture a second frame with light emitted simultaneously from both of the first and second light sources at a second time while image data of the first frame is kept in the image sensor;
retrieve image data of the first and second frames from the image sensor:
extract selectively an area with a relatively high luminance from data of each of the first and second images and determine coordinates and luminance thereof;
calculate a luminance ratio that is a ratio between the luminances of the first and second images; and
determine a distance to an object based on a direction toward the object which is determined from the coordinates of the area in one of the first and second images, the luminance ratio, and a known relationship between the direction to the object, the luminance ratio, and the distance.

2. A motion sensor device comprising:
an image sensor capable of performing an exposure process on a plurality of frames continuously without allowing image data of the frames to be retrieved;
a first light source being arranged at a first distance from the image sensor in a first direction;
a second light source being arranged at a second distance from the image sensor in a second direction, the second direction being different from the first direction, the second distance being different from the first distance; and
a controller configured to control the image sensor and the first and second light sources without contain an other light source than the first and second light sources,
wherein:
the controller is configured to:
make the image sensor capture a first frame with light emitted from the first light source at a first time;
make the image sensor capture a second frame with light emitted from the second light source at a second time while image data of the first frame is kept in the image sensor;
retrieve image data of the first and second frames from the image sensor;
obtain a first estimated distance to the object based on first and second images which have been obtained by capturing the first and second images;

obtain a second estimated distance to the object by another method of measuring the distance;

determine the distance to the object based on the first and second estimated distances;

extract selectively an area with a relatively high luminance from data of each of the first and second images and determine coordinates and luminance thereof;

calculate a luminance ratio that is a ratio between the luminances of the first and second images; and obtain the first estimated distance based on the direction toward the object which is determined from the coordinates of the area in one of the first and second images, the luminance ratio, and the known relationship between the direction, the luminance ratio, and the distance to the object.

3. The motion sensor device of claim 2, wherein:

the controller is configured to:

determine a degree of reliability of the first estimated distance by reference to the information representing the position of the object, wherein the motion sensor has a low-sensitivity range in which the degree of reliability of the first estimated distance is low when the object is located in the low-sensitivity range;

when the position of the object is in the low-sensitivity range, either discard the first estimated distance or merge the first estimated distance and the second estimated distance together with a weight added thereto according to the degree of reliability.

4. The motion sensor device of claim 3, wherein the controller corrects the degree of reliability based on a difference in coordinate between the first and second images in an area with a relatively high luminance.

5. The motion sensor device of claim 3, wherein the controller calculates the second estimated distance based on at least one of a difference in coordinate between the first and second images in an area with a relatively high luminance, the width of the area with the relatively high luminance, and the luminance.

6. The motion sensor device of claim 3, wherein the controller calculates the second estimated distance based on a time delay caused by light reflected from the object.

7. The motion sensor device of claim 6, wherein the controller measures the time delay caused by the reflected light measured by the light sources and the image sensor.

8. An electronic device comprising:

the motion sensor device of claim 1; and a display which changes what to present thereon in response to a motion of the object detected by the motion sensor device.

9. An integrated circuit for use in the motion sensor device of claim 1, the integrated circuit comprising:

a timing controller which is connected to the image sensor and the light sources to control timings of exposure and light emission;

an extreme value searching section which processes image capturing data to search an area with a relatively high luminance;

a coordinate memory which stores the coordinates and luminance of the area that has been searched by the extreme value searching section; and a distance calculating section which calculates estimated distance information based on a luminance ratio by choosing frames that have been shot in the same area under different conditions from data in the coordinate memory.

10. A distance estimating method to be performed by the motion sensor device of claim 1, the method comprising:

searching for an extreme value by extracting selectively a range with a relatively high light intensity from data of captured frames and by calculating its coordinates and light intensity;

calculating the ratio of luminances that have been extracted in the extreme value searching step and that have been selected from among luminances of frames shot under different conditions; and converting the luminance ratio calculated in the luminance ratio calculating step and the coordinates searched for in the extreme value searching step into a distance.

11. A non-transitory computer readable storage medium storing a computer program which is defined to make the motion sensor device of claim 1 perform:

searching for an extreme value by extracting selectively a range with a relatively high light intensity from data of captured frames and by calculating its coordinates and light intensity;

calculating the ratio of luminances that have been extracted in the extreme value searching step and that have been selected from among luminances of frames shot under different conditions; and converting the luminance ratio calculated in the luminance ratio calculating step and the coordinates searched for in the extreme value searching step into a distance.

* * * * *